United States Patent
Yoo et al.

(10) Patent No.: US 8,724,563 B2
(45) Date of Patent: May 13, 2014

(54) METHOD AND APPARATUS THAT FACILITATES DETECTING SYSTEM INFORMATION BLOCKS IN A HETEROGENEOUS NETWORK

(75) Inventors: Taesang Yoo, San Diego, CA (US); Tao Luo, San Diego, CA (US); Kibeom Seong, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 363 days.

(21) Appl. No.: 12/860,747

(22) Filed: Aug. 20, 2010

(65) Prior Publication Data

US 2011/0205982 A1    Aug. 25, 2011

Related U.S. Application Data

(60) Provisional application No. 61/236,254, filed on Aug. 24, 2009.

(51) Int. Cl.
*H04W 4/00* (2009.01)

(52) U.S. Cl.
USPC .......................................................... 370/329

(58) Field of Classification Search
USPC .................... 370/320, 328–339, 342, 350
See application file for complete search history.

(56) References Cited

U.S. PATENT DOCUMENTS

| | | |
|---|---|---|
| 4,857,863 A | 8/1989 | Ganger et al. |
| 5,051,625 A | 9/1991 | Ikeda et al. |
| 5,587,678 A | 12/1996 | Dijkmans |
| 5,745,012 A | 4/1998 | Oka et al. |
| 5,748,019 A | 5/1998 | Wong et al. |
| 5,786,734 A | 7/1998 | Park |
| 5,949,259 A | 9/1999 | Garcia |
| 5,973,512 A | 10/1999 | Baker |
| 5,982,246 A | 11/1999 | Hofhine et al. |
| 6,040,744 A | 3/2000 | Sakurai et al. |
| 6,147,550 A | 11/2000 | Holloway |
| 6,167,240 A | 12/2000 | Carlsson et al. |
| 6,222,851 B1 | 4/2001 | Petry |
| 6,359,869 B1 | 3/2002 | Sonetaka |
| 6,504,830 B1 | 1/2003 | Ostberg et al. |
| 6,556,094 B2 | 4/2003 | Hasegawa et al. |
| 6,653,878 B2 | 11/2003 | Nolan |

(Continued)

FOREIGN PATENT DOCUMENTS

| | | |
|---|---|---|
| EP | 1811711 A1 | 7/2007 |
| EP | 2076066 | 7/2009 |

(Continued)

OTHER PUBLICATIONS

TSGR2#4(99)414, Structure of System Information, Ericsson, 5 pages, May 1999.*

(Continued)

*Primary Examiner* — Frank Duong
(74) *Attorney, Agent, or Firm* — Nerrie M. Zohn

(57) ABSTRACT

Aspects are disclosed for detecting a system information block (SIB) within a heterogeneous network. In one aspect, a type of scheduling information pertaining to an SIB is selected, and a parameter known to a wireless terminal is associated with the type of scheduling information. The wireless terminal then decodes the SIB by deriving the scheduling information from the known parameters, without having to decode a Physical Downlink Control Channel.

81 Claims, 12 Drawing Sheets

(56) References Cited

U.S. PATENT DOCUMENTS

| | | |
|---|---|---|
| 6,677,799 B1 | 1/2004 | Brewer |
| 6,724,813 B1 | 4/2004 | Jamal et al. |
| 6,734,747 B1 | 5/2004 | Ishikawa et al. |
| 6,819,168 B1 | 11/2004 | Brewer |
| 6,819,195 B1 | 11/2004 | Blanchard et al. |
| 7,019,551 B1 | 3/2006 | Biesterfeldt |
| 7,129,798 B2 | 10/2006 | Aoyama et al. |
| 7,142,059 B2 | 11/2006 | Klein et al. |
| 7,420,395 B2 | 9/2008 | Kuramasu |
| 7,652,533 B2 | 1/2010 | Wang et al. |
| 7,710,212 B2 | 5/2010 | Seliverstov |
| 7,786,779 B2 | 8/2010 | Chang et al. |
| 7,795,902 B1 | 9/2010 | Yella |
| 7,817,666 B2 | 10/2010 | Spinar et al. |
| 7,843,886 B2 | 11/2010 | Johnson et al. |
| 7,859,314 B2 | 12/2010 | Rutkowski et al. |
| 7,924,066 B2 | 4/2011 | Gagne et al. |
| 7,940,740 B2 | 5/2011 | Krishnamurthy et al. |
| 8,010,151 B2 | 8/2011 | Kim et al. |
| 8,058,928 B2 | 11/2011 | Terzioglu |
| 8,077,670 B2 | 12/2011 | Fan et al. |
| 8,085,875 B2 | 12/2011 | Gore et al. |
| 8,228,827 B2 | 7/2012 | Jeong et al. |
| 2005/0064873 A1 | 3/2005 | Karaoguz et al. |
| 2005/0096061 A1 | 5/2005 | Ji et al. |
| 2005/0254555 A1 | 11/2005 | Teague et al. |
| 2005/0260990 A1 | 11/2005 | Huang et al. |
| 2006/0098604 A1 | 5/2006 | Flammer, III |
| 2006/0166693 A1 | 7/2006 | Jeong et al. |
| 2007/0153719 A1 | 7/2007 | Gopal |
| 2007/0167181 A1 | 7/2007 | Ramesh et al. |
| 2007/0242763 A1 | 10/2007 | Li et al. |
| 2007/0253355 A1 | 11/2007 | Hande et al. |
| 2008/0008212 A1 | 1/2008 | Wang et al. |
| 2008/0056193 A1 | 3/2008 | Bourlas et al. |
| 2008/0075032 A1 | 3/2008 | Balachandran et al. |
| 2008/0106297 A1 | 5/2008 | Jao |
| 2008/0130588 A1 | 6/2008 | Jeong et al. |
| 2008/0205322 A1 | 8/2008 | Cai et al. |
| 2008/0212514 A1 | 9/2008 | Chen |
| 2008/0227449 A1 | 9/2008 | Gholmieh et al. |
| 2008/0253300 A1 | 10/2008 | Wakabayashi et al. |
| 2008/0260000 A1 | 10/2008 | Periyalwar et al. |
| 2008/0268859 A1 | 10/2008 | Lee et al. |
| 2009/0069023 A1 | 3/2009 | Ahn et al. |
| 2009/0088175 A1 | 4/2009 | Pelletier et al. |
| 2009/0109915 A1 | 4/2009 | Pasad et al. |
| 2009/0135769 A1 | 5/2009 | Sambhwani et al. |
| 2009/0196165 A1 | 8/2009 | Morimoto et al. |
| 2009/0196250 A1 | 8/2009 | Feng et al. |
| 2009/0197631 A1 | 8/2009 | Palanki et al. |
| 2009/0201880 A1 | 8/2009 | Aghili et al. |
| 2009/0238117 A1 | 9/2009 | Somasundaram et al. |
| 2009/0252077 A1 | 10/2009 | Khandekar et al. |
| 2009/0257371 A1 | 10/2009 | Nishio |
| 2009/0257390 A1 | 10/2009 | Ji et al. |
| 2009/0264077 A1 | 10/2009 | Damnjanovic |
| 2009/0268684 A1 | 10/2009 | Lott et al. |
| 2009/0274086 A1 | 11/2009 | Petrovic et al. |
| 2009/0312024 A1 | 12/2009 | Chen et al. |
| 2009/0325626 A1 | 12/2009 | Palanki et al. |
| 2010/0008282 A1 | 1/2010 | Bhattad et al. |
| 2010/0022250 A1 | 1/2010 | Petrovic et al. |
| 2010/0029282 A1 | 2/2010 | Stamoulis et al. |
| 2010/0034158 A1 | 2/2010 | Meylan |
| 2010/0035600 A1 | 2/2010 | Hou et al. |
| 2010/0069076 A1 | 3/2010 | Ishii et al. |
| 2010/0080154 A1 | 4/2010 | Noh et al. |
| 2010/0091919 A1 | 4/2010 | Xu et al. |
| 2010/0110964 A1 | 5/2010 | Love et al. |
| 2010/0144317 A1 | 6/2010 | Jung et al. |
| 2010/0232373 A1 | 9/2010 | Nory et al. |
| 2010/0240386 A1 | 9/2010 | Hamabe et al. |
| 2010/0246521 A1 | 9/2010 | Zhang et al. |
| 2010/0254268 A1 | 10/2010 | Kim et al. |
| 2010/0254329 A1 | 10/2010 | Pan et al. |
| 2010/0254344 A1 | 10/2010 | Wei et al. |
| 2010/0272059 A1 | 10/2010 | Bienas et al. |
| 2010/0290372 A1 | 11/2010 | Zhong et al. |
| 2010/0304665 A1 | 12/2010 | Higuchi |
| 2010/0309803 A1 | 12/2010 | Toh et al. |
| 2010/0309867 A1 | 12/2010 | Palanki et al. |
| 2010/0309876 A1 | 12/2010 | Khandekar et al. |
| 2010/0323611 A1 | 12/2010 | Choudhury |
| 2011/0007673 A1 | 1/2011 | Ahn et al. |
| 2011/0013554 A1 | 1/2011 | Koskinen |
| 2011/0038271 A1 | 2/2011 | Shin et al. |
| 2011/0044227 A1 | 2/2011 | Harrang et al. |
| 2011/0053603 A1 | 3/2011 | Luo et al. |
| 2011/0064037 A1 | 3/2011 | Wei et al. |
| 2011/0116364 A1 | 5/2011 | Zhang et al. |
| 2011/0149771 A1 | 6/2011 | Abeta et al. |
| 2011/0170503 A1 | 7/2011 | Chun et al. |
| 2011/0182245 A1 | 7/2011 | Malkamaki et al. |
| 2011/0188481 A1 | 8/2011 | Damnjanovic et al. |
| 2011/0190024 A1 | 8/2011 | Seong et al. |
| 2011/0201279 A1 | 8/2011 | Suzuki et al. |
| 2011/0211503 A1 | 9/2011 | Che et al. |
| 2011/0243075 A1 | 10/2011 | Luo et al. |
| 2011/0249643 A1 | 10/2011 | Barbieri et al. |
| 2011/0275394 A1 | 11/2011 | Song et al. |
| 2011/0310830 A1 | 12/2011 | Wu et al. |
| 2011/0317624 A1 | 12/2011 | Luo et al. |
| 2012/0033588 A1 | 2/2012 | Chung et al. |
| 2012/0033647 A1 | 2/2012 | Moon et al. |
| 2012/0087250 A1 | 4/2012 | Song et al. |
| 2012/0088516 A1 | 4/2012 | Ji et al. |
| 2012/0093095 A1 | 4/2012 | Barbieri et al. |
| 2012/0093097 A1 | 4/2012 | Che et al. |
| 2012/0106481 A1 | 5/2012 | Cho et al. |
| 2012/0108239 A1 | 5/2012 | Damnjanovic et al. |
| 2012/0182958 A1 | 7/2012 | Pelletier et al. |
| 2012/0212260 A1 | 8/2012 | Chen et al. |
| 2012/0236798 A1 | 9/2012 | Raaf et al. |
| 2012/0281656 A1 | 11/2012 | Hooli et al. |
| 2013/0005344 A1 | 1/2013 | Dimou et al. |
| 2013/0077543 A1 | 3/2013 | Kim et al. |
| 2013/0229933 A1 | 9/2013 | Ji et al. |
| 2013/0250927 A1 | 9/2013 | Song |

FOREIGN PATENT DOCUMENTS

| | | |
|---|---|---|
| JP | H06350514 A | 12/1994 |
| JP | 09501038 A | 1/1997 |
| JP | 09327060 A | 12/1997 |
| JP | H1118144 A | 1/1999 |
| JP | 2006345405 A | 12/2006 |
| JP | 2007529915 A | 10/2007 |
| JP | 2008301493 A | 12/2008 |
| JP | 2009527939 A | 7/2009 |
| JP | 2010506446 A | 2/2010 |
| JP | 2010081446 A | 4/2010 |
| JP | 2010519784 A | 6/2010 |
| JP | 2010541492 A | 12/2010 |
| JP | 2011507391 A | 3/2011 |
| RU | 2007105748 A | 8/2008 |
| WO | WO-2005019705 A1 | 3/2005 |
| WO | WO-2005062798 A2 | 7/2005 |
| WO | WO2005109705 | 11/2005 |
| WO | WO-2006020021 A1 | 2/2006 |
| WO | WO-2007080892 A1 | 7/2007 |
| WO | WO2007097671 A1 | 8/2007 |
| WO | WO2007108630 A1 | 9/2007 |
| WO | 2007129620 A1 | 11/2007 |
| WO | 2008040448 A1 | 4/2008 |
| WO | WO-2008041819 A2 | 4/2008 |
| WO | 2008057969 | 5/2008 |
| WO | 2008081816 A1 | 7/2008 |
| WO | 2008086517 | 7/2008 |
| WO | 2009011059 A1 | 1/2009 |
| WO | WO2009016260 A1 | 2/2009 |
| WO | WO2009022295 | 2/2009 |
| WO | WO 2009/038367 | * 3/2009 |
| WO | WO2009038367 | 3/2009 |

(56) References Cited

FOREIGN PATENT DOCUMENTS

| WO | 2009046061 A2 | 4/2009 |
|---|---|---|
| WO | WO2009043002 | 4/2009 |
| WO | WO2009062115 | 5/2009 |
| WO | WO2009064147 A2 | 5/2009 |
| WO | WO2009065075 A1 | 5/2009 |
| WO | 2009071583 A1 | 6/2009 |
| WO | WO2009078795 A1 | 6/2009 |
| WO | 2009089798 A1 | 7/2009 |
| WO | WO2009088251 A2 | 7/2009 |
| WO | WO2009096846 A1 | 8/2009 |
| WO | WO-2009126586 A2 | 10/2009 |
| WO | WO2009152866 A1 | 12/2009 |
| WO | WO-2010006285 A2 | 1/2010 |
| WO | WO2010016726 A2 | 2/2010 |
| WO | WO2010033957 A2 | 3/2010 |
| WO | 2010110840 A2 | 9/2010 |
| WO | WO2011034966 A1 | 3/2011 |

OTHER PUBLICATIONS

3GPP TS 36.331 V8.5.0, Radio Resource Control (RRC); Protocol specification (Release 8), 204 pages, 2009.*
3GPP: "3rd Generation Partnership Project; Technical Specification Group Radio Access Network; Evolved Universal Terrestria Radio Access (E-UTRA); Physical 1 ayer procedures (Re1 ease 8)" 3GPP TS 36.213 V8.7.0 (May 2009) Technical Specification, No. V8.7.0, Jun. 8, 2009, pp. 1-77, XP002602609.
3GPP: "3rd Generation Partnership Project; Technical Specification Group Radio Access Network; Evolved Universal Terrestrial Radio Access (E-UTRA); Services provided by the physical layer (Release 8)", 3GPP Standard; 3GPP TS 36.302, 3rd Generation Partnership Project (3GPP), Mobile Competence Centre ; 650, Route Des Lucioles ; F-06921 Sophia-Antipolis Cedex ; France, No. V8.1.0, Mar. 1, 2009 , pp. 1-17, XP050377589.
3GPP: "3rd Generation Partnership Project;Technical Specification Group Radio Access Network;Further Advancements for E-UTRAPhysical Layer Aspects(Release 9)", 3GPP Draft; TR 36.814_110, 3rd Generation Partnership Project (3GPP), Mobile Competence Centre ; 650, Route Des Lucioles ; F-06921 Sophia-Antipolis Cedex ; France, no. San Francisco, USA, May 9, 2009, pp. 1-34, XP050339706, [retrieved on May 9, 2009].
3rd Generation Partnership Project: "3rd Generation Partnership Project; Technical Specification Group Radio Access Network; Evolved Universal Terrestrial Radio Access (E-UTRA) Medium Access Control (MAC) protocol specification (Release 8); 3GPP TS 36.321 V8.5.0" 3GPP TS 36.321 V8.5.0 [Online] vol. 36.321, No. V8.5.0, Mar. 1, 2009, pp. 1-46, XP002555765 Internet Retrieved from the Internet: URL:http://www.3gpp.org/ftp/Specs/html/ent 0/36321.htm> [retrieved on Oct. 21, 2009] Sections 5.1.1 to 5.1.6.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8) 3GPP Standard; 3GPP TS 36.300, 3rd Generation Partnership Project (3GPP), Mobile Competence Centre; 650, Route Des Lucioles; F-06921 Sophia-Antipolis Cedex; France, No. V8.8.0, Mar. 1, 2009, pp. 1-157, XP050377583, p. 45, line 3-p. 50, line 15.
Ericsson: 3GPP Draft; R3-083577, 3rd Generation Partnership Project (3GPP), Mobile Competence Centre ; 650, Route Des Lucioles ; F-06921 Sophia-Antipolis Cedex ; France, no. Prague, Czech Republic; 20081125, Nov. 25, 2008, XP050324756 [retrieved on Nov. 25, 2008] Section 10.1.5.1.
Ericsson: "Simultaneous reception of transport channels in the LTE", 3GPP Draft; 36302_CR0009_(Rel-8) R2-093578, 3rd Generation Partnership Project (3GPP), Mobile Competence Centre ; 650, Route Des Lucioles ; F-06921 Sophia-Antipolis Cedex ; France, no. San Francisco, USA; May 9, 2009, pp. 1-3, XP050340488, [retrieved on May 9, 2009].
Fujitsu, "An Efficient Reference Signal Design in LTE Advanced", 3GPP Draft; R1-090949, 3rd Generation Partnership Project (3GPP), Mobile Competence Centre, 650, Route Des Lucioles, F-06921 Sophia-Antipolis Cedex, France, no. Athens, Greece, Feb. 6, 2009, XP050318788.
Gale et al., "Distributed discreate resource optimization in Heterogeneous networks". 2008, pp. 560-564, IEEE 04641670.
Huawei : "Enhanced ICIC for control channels to support Het.Net,", 3GPP TSG RAN WG1 meeting #61 R1-103126, May 14, 2010, pp. 1-8, XP002660456, Montreal , Canada Retrieved from the Internet : URL:http://ftp.3gpp.org/ftp/tsg-ran/WGI-RL 1/TSGR1_61/Docs/ [retrieved on Sep. 30, 2011].
Huawei: "CQI Enhancement for Interference Varying Environments", 3GPP Draft; R1-101061 CQI Enhancement for Interference Varying Environments Ver (Final), 3rd Generation Partnership Project (3GPP), Mobile Competence Centre ; 650, Route Des Lucioles ; F-06921 Sophia-Antipolis Cedex ; France, vol. RAN WGI, no. San Francisco, USA; Feb. 22, 2010, Feb. 16, 2010, XP050418632, [retrieved on Feb. 16, 2010].
Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, no. Beijing, china; Apr. 12, 2010, XP050419318, [retrieved on Apr. 6, 2010].
Huawei: "R-PDCCH Design" 3GPP Draft; R1-093042 R-PDCCH Design, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351434 [retrieved on Aug. 18, 2009] p. 1, paragraph 1.
Inoue et al., "Space time transmit site diversity for OFDM multi base station system", 2002, pp. 30-34, IEEE 01045691.
International Search Report and Written Opinion—PCT/US2010/046455—International Search Authority, European Patent Office,Oct. 18, 2010.
Kulkarni P., et al.,"Radio Resource Management Considerations for LTE Femto Cells", ACM SIGCOMM Computer Communication Review, vol. 40, No. 1, Jan. 2010, pp. 26-30.
LG Electronics Inc: "MAC Random Access Response Extension" 3GPP Draft; R2-085237 MAC RAR Extension, 3rd Generation Partnership Project (3GPP), Mobile Competence Centre; 650, Route Des Lucioles ; F-06921 Sophia-Antipolis Cedex ; France, no. Prague, Czech Republic; Sep. 23, 2008, XP050320136, [retrieved on Sep. 23, 2008].
Panasonic: "PDCCH with cross component carrier assignment", 3GPP Draft; R1-093597(Update of R1-093464), 3rd Generation Partnership Project (3GPP), Mobile Competence Centre ; 650, Route Des Lucioles ; F-06921 Sophia-Antipolis Cedex ; France, no. Shenzhen, China; Aug. 24, 2009, XP050388168, [retrieved on Aug. 22, 2009].
Potevio: "Considerations on the Resource Indication of R-PDCCH" 3GPP Draft; R1-093443 Considerations on the Resource Indication of R-PDCCH, 3rd Generation Partnership Project (3GPP), Mobile Competence Centre ; 650, Route Des Lucioles ; F-06921 Sophia-Antipolis Cedex ; France, no. Shenzhen, China; Aug. 18, 2009, XP050351718 [retrieved on Aug. 18, 2009] p. 1, paragraph 1-paragraph 2.
QUALCOMM Europe: "Carrier Aggregation in Heterogeneous Networks", 3GPP Draft; R1-092239, 3rd Generation Partnership Project (3GPP), Mobile Competence Centre; 650, Route Des Lucioles; F-06921 Sophia-Antipolis Cedex; France, no. San Francisco, USA; May 8, 2009, XP050339658, [retrieved on May 8, 2009].
QUALCOMM Inc., "Introduction of time domain ICIC", R2-106943, 3GPP TSG-RAN WG2 Meeting #72, Jacksonville, US, Nov. 15-19, 2010, pp. 4.
QUALCOMM Inc., "RRM/RLM resource restriction for time domain ICIC", R2-110698, 3GPP TSG-RAN WG2 Meeting #72-bis, Dublin, Ireland, Jan. 17-21, 2011, pp. 8.
QUALCOMM Incorporated: "Extending Rel-8/9 ICIC into Rel-10", 3GPP Draft; R1-101505 Extending REL-8-9 ICIC Into REL-10, 3rd Generation Partnership Project (3GPP), Mobile Competence Centre ; 650, Route Des Lucioles ; F-06921 Sophia-Antipolis Cedex ; France, vol. RAN WG1, no. San Francisco, USA; Feb. 16, 2010, XP050418951, [retrieved on Feb. 16, 2010].

(56) References Cited

OTHER PUBLICATIONS

Samsung: "Clarification on the parallel receptions for PDSCHs", 3GPP Draft; 36302_CR0010 (REL-8) R2-093579, 3rd Generation Partnership Project (3GPP), Mobile Competence Centre ; 650, Route Des Lucioles ; F-06921 Sophia-Antipolis Cedex ; France, no. San Francisco, USA; May 19, 2009, pp. 1-2, XP050340489, [retrieved on May 19, 2009].

Samsung: "Downlink Subframe Alignment in Type I Relay" 3GPP Draft; R1-093386 Downlink Subframe Alignment in Type I Relay, 3rd Generation Partnership Project (3GPP), Mobile Competence Centre ; 650, Route Des Lucioles ; F-06921 Sophia-Antipolis Cedex ; France, no. Shenzhen, China; Aug. 19, 2009, XP050351683 [retrieved on Aug. 19, 2010] p. 1, paragraph 1.

Samsung: "Inbound mobility to H(e)NBs" 3GPP Draft; R2-093250_Inbound Mobility to H(E)NBS-R4, 3rd Generation Partnership Project (3GPP), Mobile Competence Centre ; 650, Route Des Lucioles ; F-06921 Sophia- Antipolis Cedex ; France, no. San Francisco, USA; Apr. 28, 2009, XP050340933 [retrieved on Apr. 28, 2009].

Vice Chairman: "Report of E-UTRA control plane session" 3GPP Draft; R2-082841- Chair-Report-RAN2-62-LTE-CP, 3rd Generation Partnership Project (3GPP), Mobile Competence Centre ; 650, Route Des Lucioles ; F-06921 Sophia-Antipolis Cedex ; France, v o l . RAN WG2, no. Kansas City, USA; May 14, 2008, XP050140403 [retrieved on May 14, 2008].

Young Jin Sang, et al., "A Self-Organized Femtocell for IEEE 802.16e System", Global Telecommunications Conference, 2009. GLOBECOM 2009. IEEE, IEEE, Piscataway, NJ, USA, Nov. 30, 2009, pp. 1-5, XP031646102, ISBN: 978-1-4244-4148-8.

Alcatel-Lucent Shanghai Bell et al., "Multi-cell cooperative RS in CoMP", 3GPP Draft; R1-092317, 3rd Generation Partnership Project (3GPP), Mobile Competence Centre; 650, Route des Lucioles; F-06921 Sophia-Antipolis Cedex; France, No. Los Angeles, USA; Jun. 24, 2009, XP050350848, [retrieved on Jun. 24, 2009].

Garcia F., et al., "Design of a slew rate controlled output buffer", ASIC Conference 1998. Proceedings. Eleventh Annual IEEE International Rochester, NY, USA Sep. 13-16, 1998, New York, NY, USA. IEEE, US, Sep. 13, 1998, pp. 147150, XP010309693, DOI: 10.1109/ASIC.1998.722821 ISBN: 978-0-7803-4980-3.

Huawei: "Discussion on OTDOA based positioning issue", 3GPP Draft; R1-092355, 3rd Generation Partnership Project (3GPP), Mobile Competence Centre; 650, Route des Lucioles; F-06921 Sophia-Antipolis Cedex; France, No. Los Angeles, USA, Jun. 24, 2009, XP050350879, [retrieved on Jun. 24, 2009].

Qualcomm Europe: "DL Carrier Aggregation Performance in Heterogeneous Networks", [online], 3GPP TSG-RAN WG1#58, R1-093145, URL: http://www.3gpp.org/ftp/tsg_ran/WG1_RL1/TSGR1_58/Docs/R1-093145.zip.

European Search Report—EP13165760—Search Authority—Munich—Jun. 24, 2013.

European Search Report—EP13165764—Search Authority—Munich—Jun. 4, 2013.

Taiwan Search Report—TW099128308—TIPO—Jun. 17, 2013.

\* cited by examiner

FIG. 10

METHOD AND APPARATUS THAT FACILITATES DETECTING SYSTEM INFORMATION BLOCKS IN A HETEROGENEOUS NETWORK

CROSS-REFERENCE TO RELATED APPLICATIONS

This application claims the benefit of U.S. Provisional Patent Application Ser. No. 61/236,254 entitled "A METHOD AND APPARATUS FOR SYSTEM INFORMATION BLOCK TYPE DETECTION IN HETEROGENEOUS NETWORK," which was filed Aug. 24, 2009. The aforementioned application is herein incorporated by reference in its entirety.

BACKGROUND

I. Field

The following description relates generally to wireless communications, and more particularly to detecting system information blocks in heterogeneous networks.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With respect to system information block transmissions, it is noted that decoding such transmissions has become increasingly more difficult with the expansion of heterogeneous networks (i.e., networks having macro cells, femto cells, and/or pico cells). Namely, wireless terminals within a heterogeneous network may experience interference from multiple base stations transmitting their respective system information blocks. Accordingly, methods and apparatuses which mitigate such interference are desirable.

The above-described deficiencies of current wireless communication systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with detecting system information blocks in heterogeneous networks. In one aspect, methods and computer program products are disclosed that facilitate detecting a system information block. These embodiments include selecting a type of scheduling information pertaining to the system information block, and associating a known parameter with the type of scheduling information. For these embodiments, a decoding of the system information block is facilitated by an association of the known parameter with the type of scheduling information independent of a Physical Downlink Control Channel transmission. The system information block is then transmitted to a wireless terminal.

In another aspect, an apparatus configured to facilitate detecting a system information block is disclosed. Within such embodiment, the apparatus includes a processor configured to execute computer executable components stored in memory. The computer executable components include a scheduling component, an association component, and a communication component. The scheduling component is configured to select a type of scheduling information pertaining to the system information block, whereas the association component is configured to associate a known parameter with the type of scheduling information. For this embodiment, a decoding of the system information block is also facilitated by an association of the known parameter with the type of scheduling information independent of a Physical Downlink Control Channel transmission. The communication component is then configured to transmit the system information block to a wireless terminal.

In a further aspect, another apparatus is disclosed. Within such embodiment, the apparatus includes means for selecting, means for associating, and means for transmitting. For this embodiment, the means for selecting selects a type of scheduling information pertaining to the system information block, whereas the means for associating associates a known parameter with the type of scheduling information. For this embodiment, a decoding of the system information block is again facilitated by an association of the known parameter with the type of scheduling information independent of a Physical Downlink Control Channel transmission. The means for transmitting then transmits the system information block to a wireless terminal.

In another aspect, methods and computer program products are disclosed that facilitate detecting a system information block. These embodiments include receiving a transmission of the system information block, and deriving a type of scheduling information associated with the transmission from at least one known parameter. Furthermore, these embodiments include decoding the system information block based on the type of scheduling information. Here, it should be noted that the decoding is performed independent of a Physical Downlink Control Channel transmission.

In another aspect, an apparatus configured to facilitate detecting a system information block is disclosed. Within such embodiment, the apparatus includes a processor configured to execute computer executable components stored in memory. The computer executable components include a communication component, a derivation component, and a decoding component. The communication component is configured to receive a transmission of the system information block, whereas the derivation component is configured to derive scheduling information associated with the transmission from at least one known parameter. The decoding component is then configured to perform a decoding of the system information block based on the type of scheduling information. For this particular embodiment, the decoding is also performed independent of a Physical Downlink Control Channel transmission.

In a further aspect, another apparatus is disclosed. Within such embodiment, the apparatus includes means for receiving, means for deriving, and means for decoding. For this embodiment, the means for receiving receives a transmission of the system information block, whereas the means for deriving derives scheduling information associated with the transmission from at least one known parameter. For this embodiment, the means for decoding then decodes the system information block based on the constraint and the scheduling information. Here, the system information block is again decoded independent of a Physical Downlink Control Channel transmission.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

BRIEF DESCRIPTION OF THE DRAWINGS

FIG. 10 is an illustration of an exemplary communication system implemented in accordance with various aspects including multiple cells.

DETAILED DESCRIPTION

Figure 1:
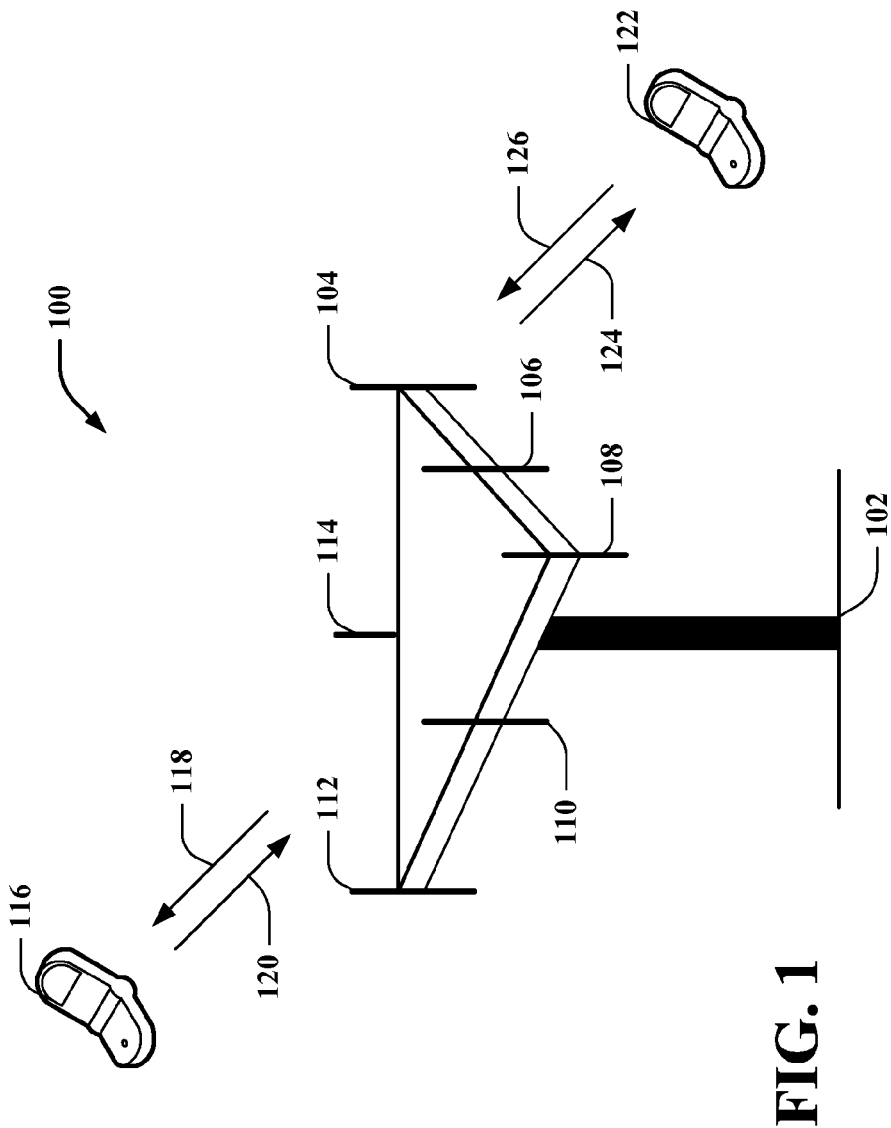
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

The subject specification is directed towards detecting system information blocks in heterogeneous networks. Exemplary embodiments are disclosed for mitigating interference associated with system information block transmissions within heterogeneous networks. Various interference mitigation schemes are disclosed including, for example, a scheme independent of a Physical Downlink Control Channel transmission which associates scheduling information with parameters known to wireless terminals, as well as a scheduling scheme which schedules system information block transmissions based on scheduling information pertaining to interfering system information block transmissions.

To this end, it is noted that the techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA), High Speed Packet Access (HSPA), and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

High speed packet access (HSPA) can include high speed downlink packet access (HSDPA) technology and high speed uplink packet access (HSUPA) or enhanced uplink (EUL) technology and can also include HSPA+ technology. HSDPA, HSUPA and HSPA+ are part of the Third Generation Partnership Project (3GPP) specifications Release 5, Release 6, and Release 7, respectively.

High speed downlink packet access (HSDPA) optimizes data transmission from the network to the user equipment (UE). As used herein, transmission from the network to the user equipment UE can be referred to as the "downlink" (DL). Transmission methods can allow data rates of several Mbits/s. High speed downlink packet access (HSDPA) can increase the capacity of mobile radio networks. High speed uplink packet access (HSUPA) can optimize data transmission from the terminal to the network. As used herein, transmissions from the terminal to the network can be referred to as the "uplink" (UL). Uplink data transmission methods can allow data rates of several Mbit/s. HSPA+ provides even further improvements both in the uplink and downlink as specified in Release 7 of the 3GPP specification. High speed packet access (HSPA) methods typically allow for faster interactions between the downlink and the uplink in data services transmitting large volumes of data, for instance Voice over IP (VoIP), videoconferencing and mobile office applications Fast data transmission protocols such as hybrid automatic repeat request, (HARQ) can be used on the uplink and downlink. Such protocols, such as hybrid automatic repeat request (HARQ), allow a recipient to automatically request retransmission of a packet that might have been received in error.

Various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB), access point base station, or some other terminology.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Figure 2:
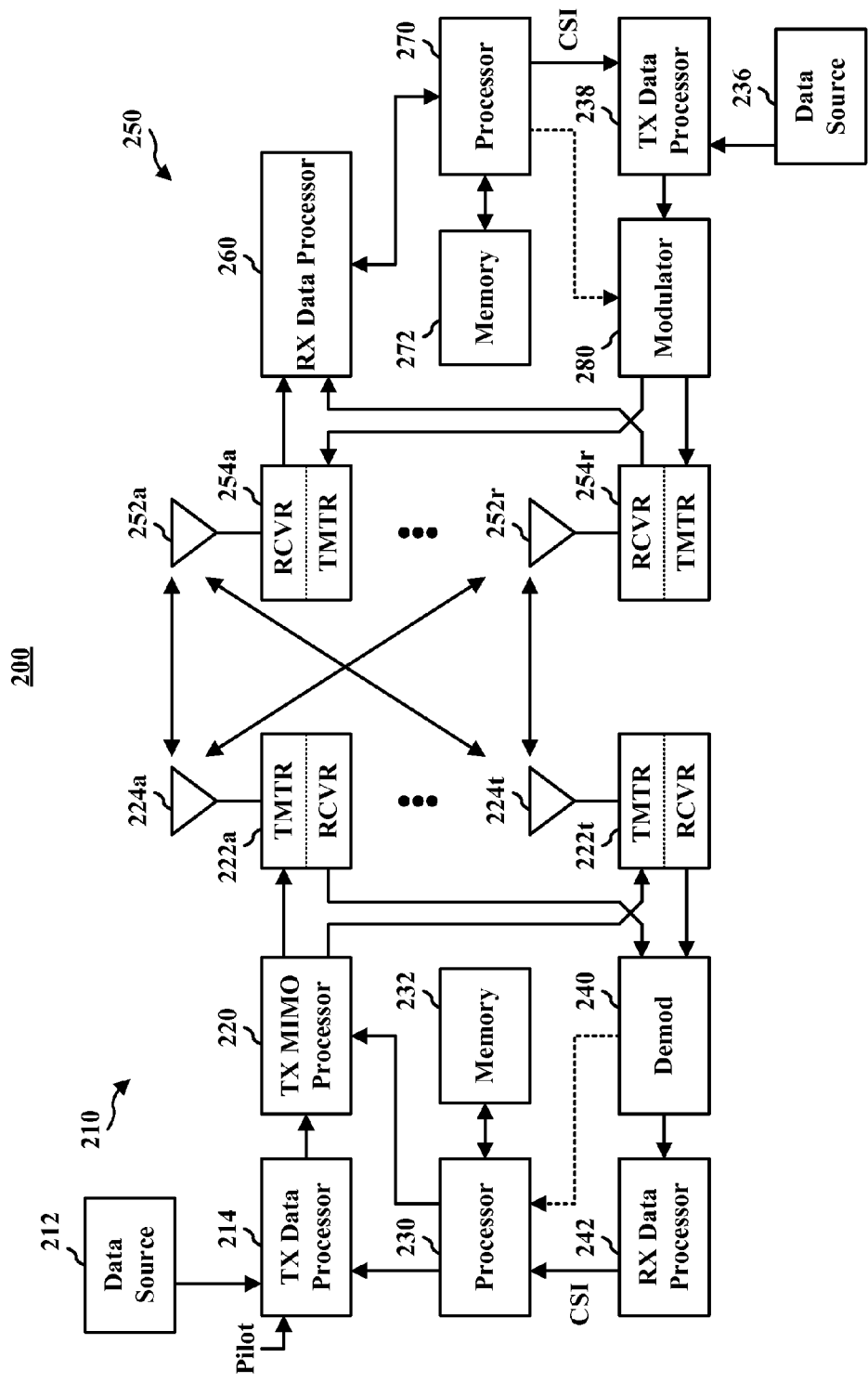
FIG. 2 is an illustration of an exemplary wireless network environment that can be employed in conjunction with the various systems and methods described herein.

FIG. 2 shows an example wireless communication system 200. The wireless communication system 200 depicts one base station 210 and one access terminal 250 for sake of brevity. However, it is to be appreciated that system 200 can include more than one base station and/or more than one access terminal, wherein additional base stations and/or access terminals can be substantially similar or different from example base station 210 and access terminal 250 described below. In addition, it is to be appreciated that base station 210 and/or access terminal 250 can employ the systems and/or methods described herein to facilitate wireless communication there between.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At access terminal 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

A processor 270 can periodically determine which available technology to utilize as discussed above. Further, processor 270 can formulate a reverse link message comprising a matrix index portion and a rank value portion.

The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from access terminal 250 are received by antennas 224, conditioned by receivers 222, demodulated by a demodulator 240, and processed by a RX data processor 242 to extract the reverse link message transmitted by access terminal 250. Further, processor 230 can process the extracted message to determine which precoding matrix to use for determining the beamforming weights.

Processors 230 and 270 can direct (e.g., control, coordinate, manage, etc.) operation at base station 210 and access terminal 250, respectively. Respective processors 230 and 270 can be associated with memory 232 and 272 that store program codes and data. Processors 230 and 270 can also perform computations to derive frequency and impulse response estimates for the uplink and downlink, respectively.

Figure 3:
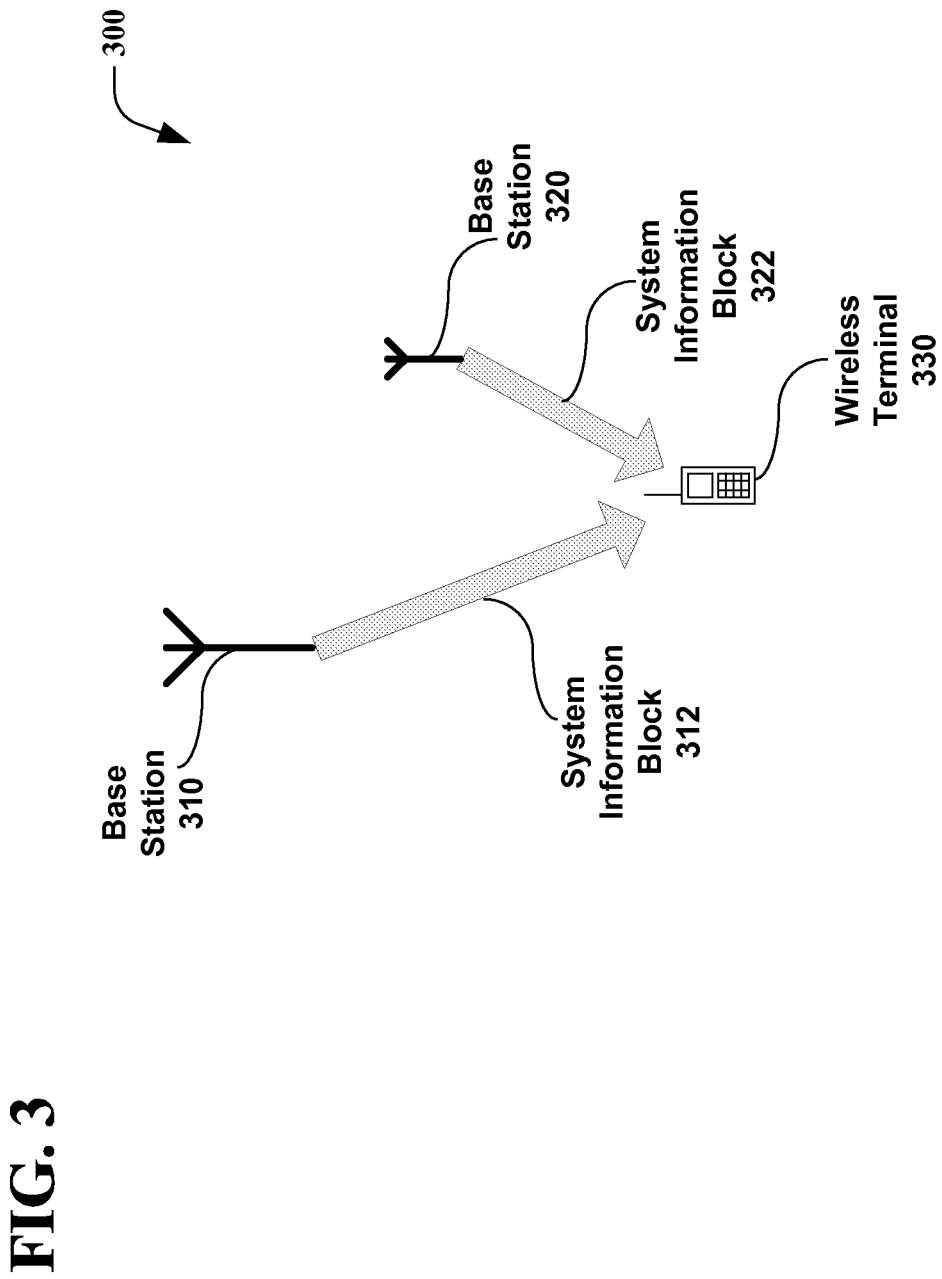
FIG. 3 is an illustration of an exemplary heterogeneous system that facilitates detecting system information blocks according to an embodiment.

Referring next to FIG. 3, an exemplary system is illustrated that facilitates detecting system information blocks in accordance with aspects described herein. As illustrated, system 300 includes base station 310, base station 320, and wireless terminal 330. In an aspect, it is contemplated that system 300 is a heterogeneous network, wherein base station 310 is a macro evolved node B (eNB), and wherein base station 320 is an access point base station associated with a femto/pico cell. Within such embodiment, wireless terminal experiences interference upon receiving both system information block 312 from base station 310 and system information block 322 from base station 320. To mitigate such interference, various interference mitigation schemes are disclosed.

For instance, an interference mitigation scheme is disclosed which allows wireless terminals to decode system information blocks without having to decode a Physical Downlink Control Channel (PDCCH) transmission. To this end, it is noted that, for legacy wireless terminals, the wireless terminal needs to decode PDCCH to obtain scheduling information (e.g., resource block allocation, modulation and coding scheme (MCS), etc) necessary for decoding a system information block. Since it may be challenging for a wireless terminal to decode PDCCH under strong interference, an embodiment directed towards a PDCCH-less operation is disclosed which allows wireless terminals to obtain scheduling information without decoding PDCCH. Moreover, aspects are disclosed in which the network provides scheduling information pertaining to system information block transmissions on known resource block locations, which the wireless terminal can derive from a cell identifier, system frame number, or other known parameters. Other scheduling information, such as MCS, may not be explicitly known to the wireless terminal, in which case the wireless terminal can rely on blind decoding. Therefore, a wireless terminal can derive all the scheduling information necessary for system information block decoding by either explicitly deriving known parameters or relying on blind decoding which associates scheduling information with parameters known to wireless terminals, as well as a scheduling scheme which schedules system information block transmissions based on scheduling information pertaining to interfering system information block transmissions.

Here, it is noted that PDCCH may still be transmitted for backward compatibility, so that legacy wireless terminals, which are unaware of PDCCH-less operation, can obtain scheduling information for system information block transmissions via decoding PDCCH. However, for non-legacy wireless terminals (e.g., LTE Release-9+), it would be redundant to decode PDCCH for system information block transmissions.

In another aspect, scheduling embodiments are disclosed in which base stations coordinate system information block scheduling to enable wireless terminals to perform system information block decoding under strong interference. One approach is for base stations to orthogonalize system information block transmissions, i.e. base stations schedule their system information blocks on different resource block locations, and they do not schedule (or at least power down) any other Physical Downlink Shared Channels (PDSCHs) on neighboring base stations' system information block resource block locations. Another approach is for base stations to schedule their system information blocks on the same resource block locations. In this case, a wireless terminal may first decode a system information block from the strong interferer, cancel out its contents, and then decode a system information block from the weaker serving cell. A hybrid approach is also possible, wherein the system information blocks may or may not collide. In which case, the wireless terminal can apply interference cancellation techniques when the system information blocks collide. Here, it should be noted that wireless terminals may distinguish collision cases from orthogonalization cases via known system parameters such as a system frame number, cell identifier, etc.

Figure 4:
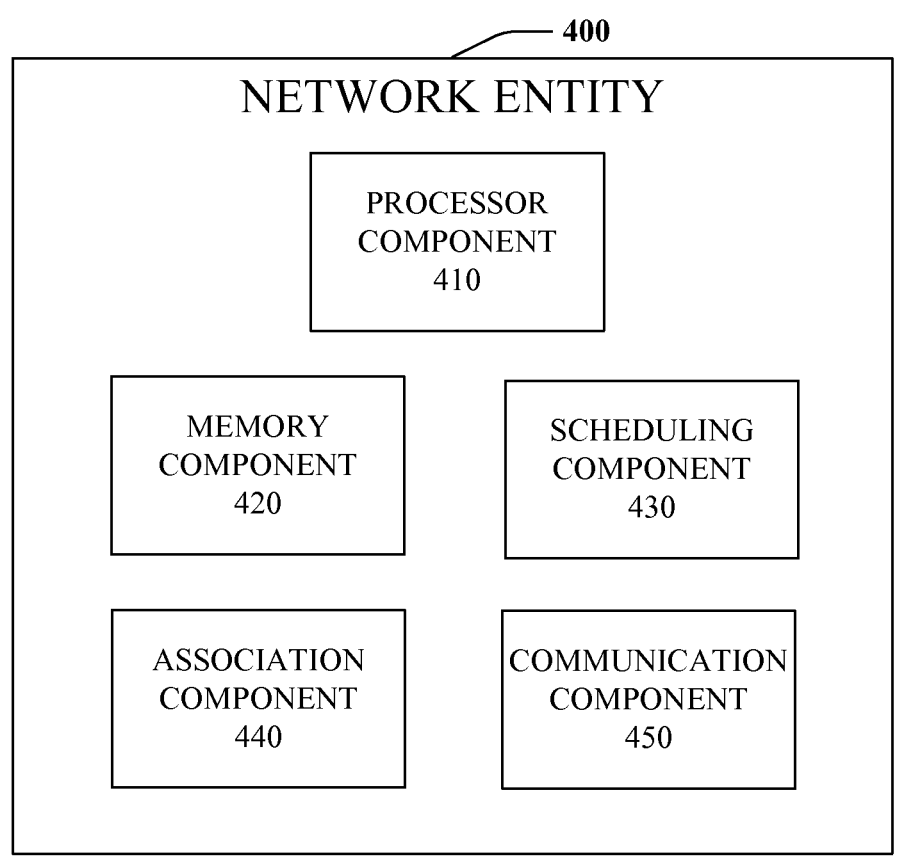
FIG. 4 illustrates a block diagram of an exemplary network entity that facilitates detecting system information blocks in accordance with an aspect of the subject specification.

Referring next to FIG. 4, an exemplary network entity that facilitates detecting a system information block within a heterogeneous network according to an embodiment is illustrated. As shown, network entity 400 may include processor component 410, memory component 420, scheduling component 430, association component 440, and communication component 450. Here, it should be appreciated that network entity 400 may reside within any of a plurality of network entities including, for example, an evolved node B (eNB).

In one aspect, processor component 410 is configured to execute computer-readable instructions related to performing any of a plurality of functions. Processor component 410 can be a single processor or a plurality of processors which analyze information to be communicated from network entity 400 and/or generate information that is utilized by memory component 420, scheduling component 430, association component 440, and/or communication component 450. Additionally or alternatively, processor component 410 may be configured to control one or more components of network entity 400.

In another aspect, memory component 420 is coupled to processor component 410 and configured to store computer-readable instructions executed by processor component 410. Memory component 420 may also be configured to store any of a plurality of other types of data including generated by any of scheduling component 430, association component 440, and/or communication component 450. Memory component 420 can be configured in a number of different configurations, including as random access memory, battery-backed memory, hard disk, magnetic tape, etc. Various features can also be implemented upon memory component 420, such as compression and automatic back up (e.g., use of a Redundant Array of Independent Drives configuration).

As illustrated, network entity 400 may further include scheduling component 430. Within such embodiment, scheduling component 430 may be configured to select a type of scheduling information pertaining to a system information block. In an aspect, it is contemplated that such system information block may be any of a plurality of types of system information blocks including, for example, a type one system information block (SIB1) or a type two system information block (SIB2). Furthermore, it should be noted that the type of scheduling information pertaining to the system information block may vary. For instance, such scheduling information may include a resource block allocation and/or a modulation and coding scheme (MCS). In a particular embodiment, scheduling component 430 is configured to limit a possible number of modulation and coding scheme choices. Within such embodiment, a reduction of blind decode operations performed by a wireless terminal is facilitated by the limit.

In another aspect, network entity 400 includes association component 440, which is configured to associate a parameter known by a wireless terminal with the type of scheduling information selected by scheduling component 430. Here, it should again be noted that such parameter can be any of a plurality of parameters known by wireless terminals independent of a Physical Downlink Control Channel transmission. For instance, the known parameter can be a system frame number or a cell identifier. Accordingly, by associating the known parameter with the type of scheduling information, it is contemplated that a wireless terminal may decode a system information block independent of a Physical Downlink Control Channel transmission.

In yet another aspect, network entity 400 includes communication component 450, which is coupled to processor component 410 and configured to interface network entity 400 with external entities. For instance, communication component 450 may be configured to transmit the system information block to a wireless terminal. In a particular embodiment, communication component 450 is configured to communicate the system information block to a plurality of wireless terminals via a plurality of redundancy versions (RVs). Here, it is contemplated that a first subset of the plurality of RVs is associated with legacy wireless terminals, whereas a second subset of the plurality of RVs is associated with non-legacy wireless terminals. Within such embodiment, communication component 450 is configured to provide the second subset of the plurality of RVs according to a subset of the scheduling information derived from the known parameter, wherein the known parameter is known by at least one of the non-legacy wireless terminals.

In other aspects, network entity 400 may be configured to mitigate interference by utilizing scheduling information associated with neighboring nodes. For instance, communication component 450 may be configured to ascertain scheduling information associated with an interfering system information block transmission, wherein the interfering system information block transmission is scheduled to be transmitted from an interfering base station. Scheduling component 430 may then be configured to schedule a system information block transmission (e.g., an SIB1 transmission, an SIB2 transmission, etc.) based on the scheduling information associated with the interfering system information block transmission.

To this end, it should be noted that scheduling component 430 may be configured to schedule system information block transmissions in any of a plurality of ways. For instance, in an aspect, scheduling component 430 is configured to orthogonalize such transmissions with the interfering system information block transmission. In a particular embodiment, such orthogonalization is performed in the frequency domain, wherein scheduling component 430 is configured to utilize a non-overlapping resource block allocation.

In another aspect, scheduling component 430 is configured to collide system information block transmissions with the interfering system information block transmission. For instance, scheduling component 430 may be configured to utilize an identical resource block allocation to collide system information block transmissions with the interfering system information block transmission. In a particular embodiment, base station 400 may be configured to synchronize its system frame number with interfering system frame numbers and scheduling component 430 may then be configured to derive the resource block allocation from a synchronized system frame number, thereby achieving colliding system information block transmissions.

It is also contemplated that system information block transmissions may partly collide with interfering system information block transmissions. For instance, scheduling component 430 may be configured to collide a first transmission of the system information block with a first interfering system information block transmission, to orthogonalize a second transmission of the system information block with a second interfering system information block transmission, and to partially collide a third transmission of the system information block with a third interfering system information block transmission. In an aspect, scheduling component 430 may be further configured to derive a resource block allocation according to a particular parameter known by wireless terminals. For example, such resource block allocation may be derived from a system frame number and/or a cell identifier.

Figure 5:
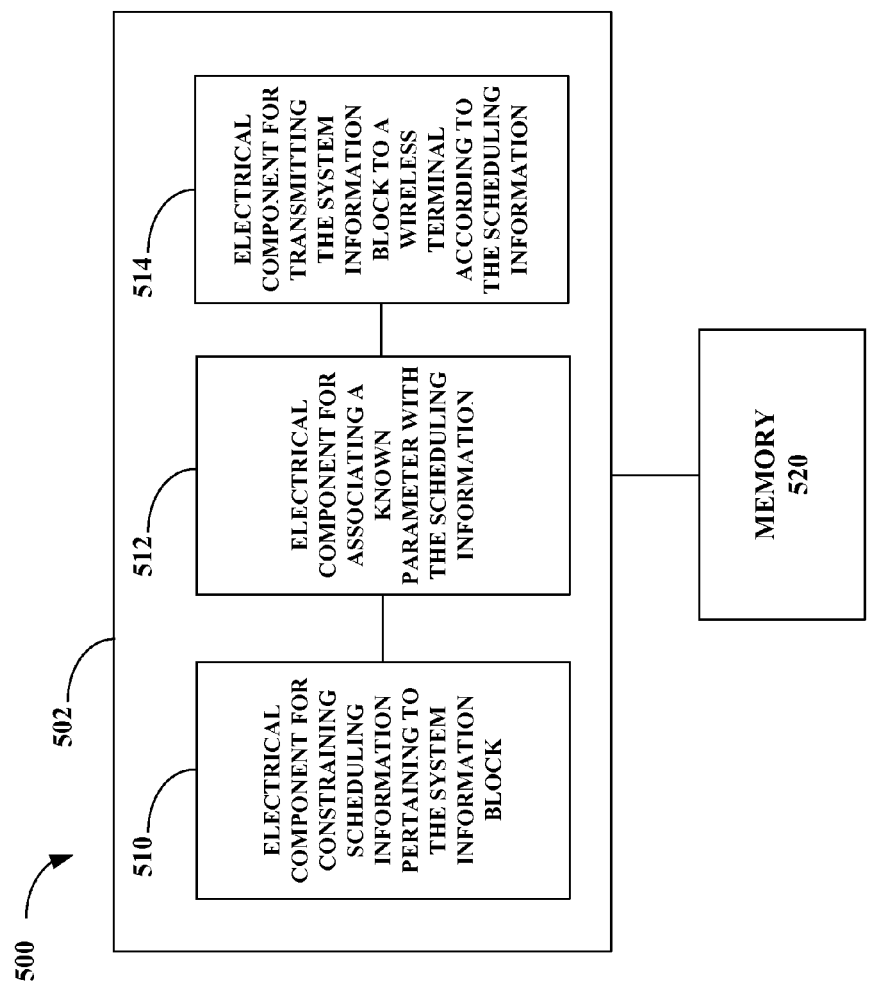
FIG. 5 is an illustration of a first exemplary coupling of electrical components that effectuate detecting system information blocks.

Turning to FIG. 5, illustrated is a system 500 that facilitates detecting a system information block according to an embodiment. System 500 and/or instructions for implementing system 500 can reside within a base station (e.g., network entity 400). As depicted, system 500 includes functional blocks that can represent functions implemented by a processor using instructions and/or data from a computer readable storage medium. System 500 includes a logical grouping 502 of electrical components that can act in conjunction. As illustrated, logical grouping 502 can include an electrical component for selecting a type of scheduling information pertaining to the system information block 510. Furthermore, logical grouping 502 can include an electrical component for associating a known parameter with the type of scheduling information 512. Logical grouping 502 can also include an electrical component for transmitting the system information block to a wireless terminal 514. Additionally, system 500 can include a memory 520 that retains instructions for executing functions associated with electrical components 510, 512, and 514. While shown as being external to memory 520, it is to be understood that electrical components 510, 512, and 514 can exist within memory 520.

Figure 6:
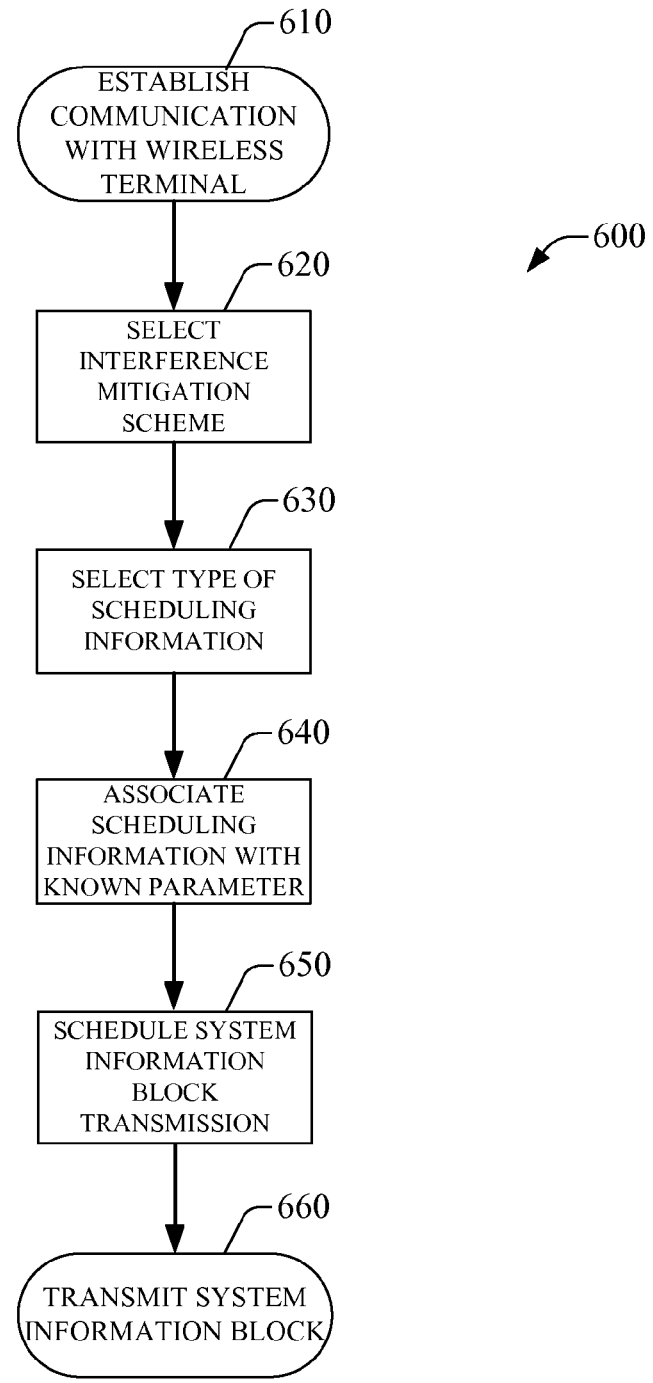
FIG. 6 is a first flow chart illustrating an exemplary methodology that facilitates detecting system information blocks in accordance with an aspect of the subject specification.

Referring next to FIG. 6, a flow chart illustrating an exemplary method that facilitates detecting system information blocks in heterogeneous networks is provided. As illustrated, process 600 includes a series of acts that may be performed within a base station (e.g., network entity 400) according to an aspect of the subject specification. For instance, process 600 may be implemented by employing a processor to execute computer executable instructions stored on a computer readable storage medium to implement the series of acts. In another embodiment, a computer-readable storage medium comprising code for causing at least one computer to implement the acts of process 600 are contemplated.

In an aspect, process 600 begins with a communication with a wireless terminal being established at act 610. At act 620, process 600 continues with the selection of a particular interference mitigation scheme. As mentioned previously, it is contemplated that any of a plurality of interference mitigation schemes may be implemented (e.g., orthogonal scheduling, colliding scheduling, partly colliding scheduling, etc.), wherein a PDCCH-less scheme may be used to associate scheduling information with parameters known to wireless terminals. When PDCCH-less scheme is used, the selection of modulation and coding scheme may be constrained to reduce the number of blind decodes at the wireless terminal.

Once the interference mitigation scheme has been selected, process 600 then proceeds to act 630 to select a type of scheduling information (e.g. a modulation and coding scheme (MCS)) directed towards a system information block transmission, wherein the choice of MCS may be optionally constrained. Process 600 then proceeds to act 640 where other scheduling information (e.g., resource block allocation) is determined by associating them with a parameter known to wireless terminals. A system information block transmission is then scheduled at act 650 according to the determined scheduling information, and subsequently transmitted to a wireless terminal at act 660.

Here, it should be noted that, depending on how the resource block allocation is determined, any of various types of scheduling schemes may be implemented including, for example, an orthogonal scheduling, a colliding scheduling, and/or a partly colliding scheduling. For example, if all base stations derive the resource block allocation from a system frame number, and if the system frame number is synchronized across base stations, then all the system information block transmissions will be colliding. On the other hand, if each base station derives the resource block allocation based on some function of its cell identifier, then a fully colliding, orthogonal, and/or partly colliding transmissions may be achieved, depending on the nature of the function used.

Figure 7:
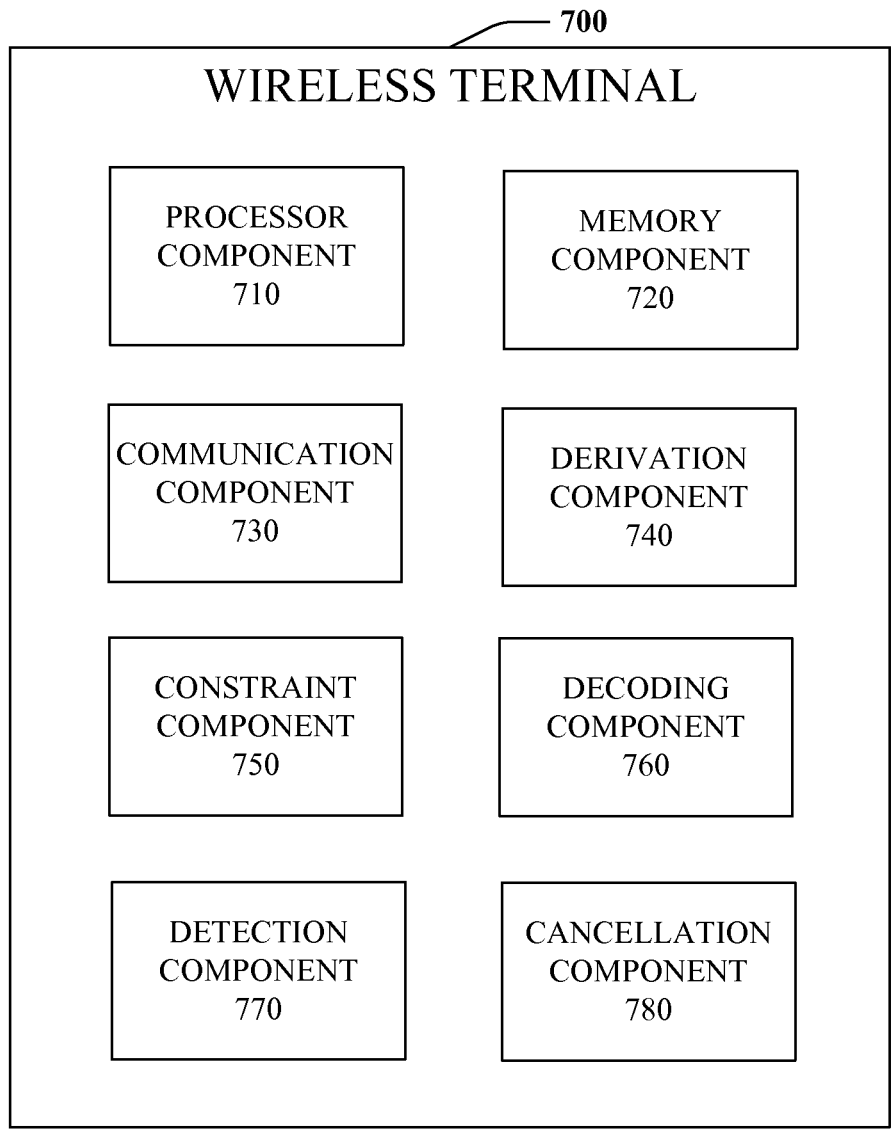
FIG. 7 illustrates a block diagram of an exemplary wireless terminal that facilitates detecting system information blocks in accordance with an aspect of the subject specification.

Referring next to FIG. 7, a block diagram illustrates an exemplary wireless terminal that facilitates detecting a system information block in accordance with various aspects. As illustrated, wireless terminal 700 may include processor component 710, memory component 720, communication component 730, derivation component 740, constraint component 750, decoding component 760, detection component 770, and cancellation component 780.

Similar to processor component 410 in network entity 400, processor component 710 is configured to execute computer-readable instructions related to performing any of a plurality of functions. Processor component 710 can be a single processor or a plurality of processors dedicated to analyzing information to be communicated from wireless terminal 700 and/or generating information that can be utilized by memory component 720, communication component 730, derivation component 740, constraint component 750, decoding component 760, detection component 770, and/or cancellation component 780. Additionally or alternatively, processor component 710 may be configured to control one or more components of wireless terminal 700.

In another aspect, memory component 720 is coupled to processor component 710 and configured to store computer-readable instructions executed by processor component 710. Memory component 720 may also be configured to store any of a plurality of other types of data including data generated by any of communication component 730, derivation component 740, constraint component 750, decoding component 760, detection component 770, and/or cancellation component 780. Here, it should be noted that memory component 720 is analogous to memory component 420 in network entity 400. Accordingly, it should be appreciated that any of the aforementioned features/configurations of memory component 420 are also applicable to memory component 720.

In yet another aspect, wireless terminal 700 includes communication component 730, which is coupled to processor component 710 and configured to interface wireless terminal 700 with external entities. For instance, communication component 730 may be configured to receive a transmission of a system information block (e.g., an SIB1 transmission, an SIB2 transmission, etc.). In a particular embodiment, system information block transmissions are received via a plurality of redundancy versions. Within such embodiment, communication component 730 is configured to distinguish a first subset of the plurality of redundancy versions associated with legacy wireless terminals from a second subset of the plurality of redundancy versions associated with non-legacy wireless terminals. Here, it is contemplated that system information block transmissions provided via the second subset may be decoded by wireless terminal 700 without having to decode a Physical Downlink Control Channel transmission, whereas system information block transmissions provided via the first subset may require decoding a Physical Downlink Control Channel transmission.

As illustrated, wireless terminal 700 may also include derivation component 740. Within such embodiment, derivation component 740 is configured to derive a type of scheduling information associated with system information block transmissions from at least one parameter known to wireless terminal 700. Here, it should be noted that the derived type of scheduling information may include various types of scheduling information including, for example, a resource block allocation, whereas the at least one parameter known to wireless terminal 700 may include various types of known parameters including, for example, a system frame number or a cell identifier.

In another aspect, wireless terminal 700 includes constraint component 750, which is configured to identify a constraint associated with a second type of scheduling information. Here, it is contemplated that any of a plurality of constraints may be implemented. For instance, in a particular embodiment, the constraint is associated with a limiting of a possible number of modulation and coding scheme choices, wherein a reduction of blind decode operations performed by wireless terminal 700 is facilitated by the constraint.

Wireless terminal 700 may also include decoding component 750. Within such embodiment, decoding component 750 is configured to decode system information blocks based on the type of scheduling information derived by derivation component 730. Moreover, by deriving the type of scheduling information from known parameters, decoding component 750 may decode system information blocks independent of a Physical Downlink Control Channel transmission.

In a further aspect, it is contemplated that wireless terminal 700 may be configured to perform interference cancellation techniques upon receiving system information blocks that either fully collide or partly collide. For instance, communication component 730 may be configured to receive a first system information block from a first base station and a second system information block from a second base station, wherein either of the first or second system information blocks can be any of various types of system information blocks (e.g., an SIB1, an SIB2, etc.). Detection component 770 is then configured to detect a collision between the first system information block and the second system information block. In an aspect, detection component is configured to analyze a parameter known to wireless terminal 700 which may, for example, include a system frame number or a cell identifier. For this embodiment, cancellation component 780 is then configured to cancel reconstructed symbols corresponding to the contents decoded from the first system information block based on a detection of the collision, whereas decoding component 760 is configured to decode the second system information block once the reconstructed symbols corresponding to the contents decoded from the first system information block are cancelled.

Figure 8:
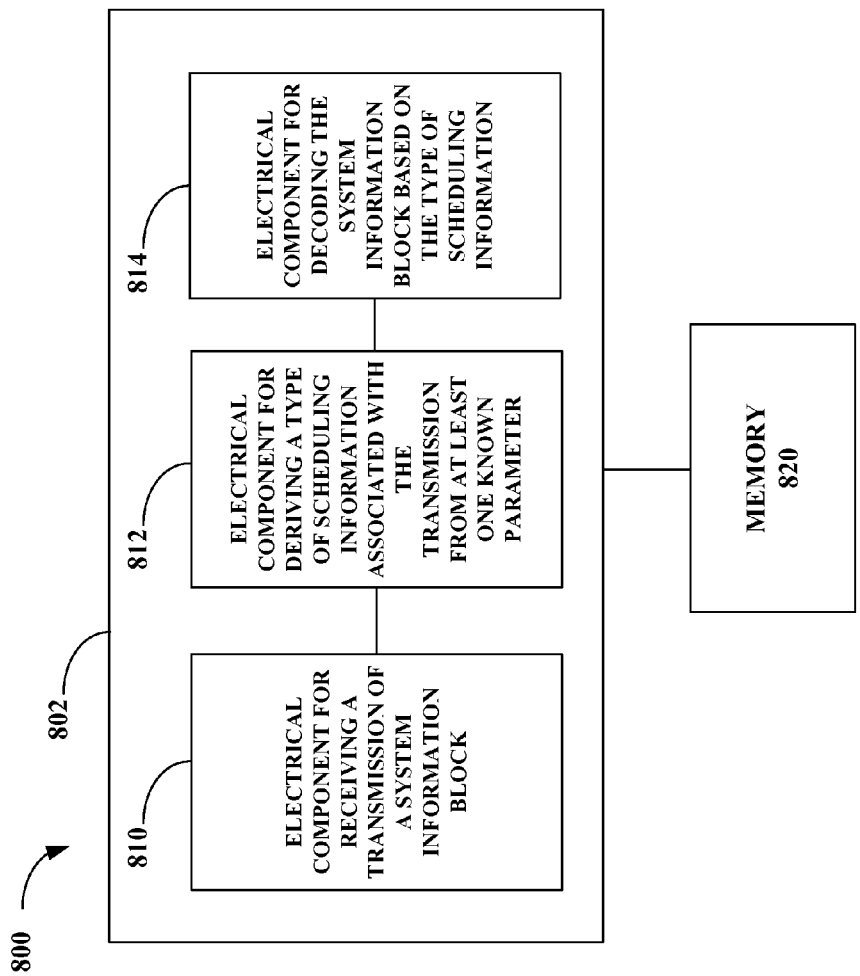
FIG. 8 is an illustration of a second exemplary coupling of electrical components that effectuate detecting system information blocks.

Turning to FIG. 8, illustrated is a system 800 that facilitates detecting a system information block according to an embodiment. System 800 and/or instructions for implementing system 800 can reside within user equipment (e.g., wireless terminal 700). As depicted, system 800 includes functional blocks that can represent functions implemented by a processor using instructions and/or data from a computer readable storage medium. System 800 includes a logical grouping 802 of electrical components that can act in conjunction. As illustrated, logical grouping 802 can include an electrical component for receiving a transmission of a system information block 810, as well as an electrical component for deriving a type of scheduling information associated with the transmission from at least one known parameter 812. Furthermore, logical grouping 802 can include an electrical component for decoding the system information block based on the type of scheduling information 814. Additionally, system 800 can include a memory 820 that retains instructions for executing functions associated with electrical components 810, 812, and 814. While shown as being external to memory 820, it is to be understood that electrical components 810, 812, and 814 can exist within memory 820.

Figure 9:
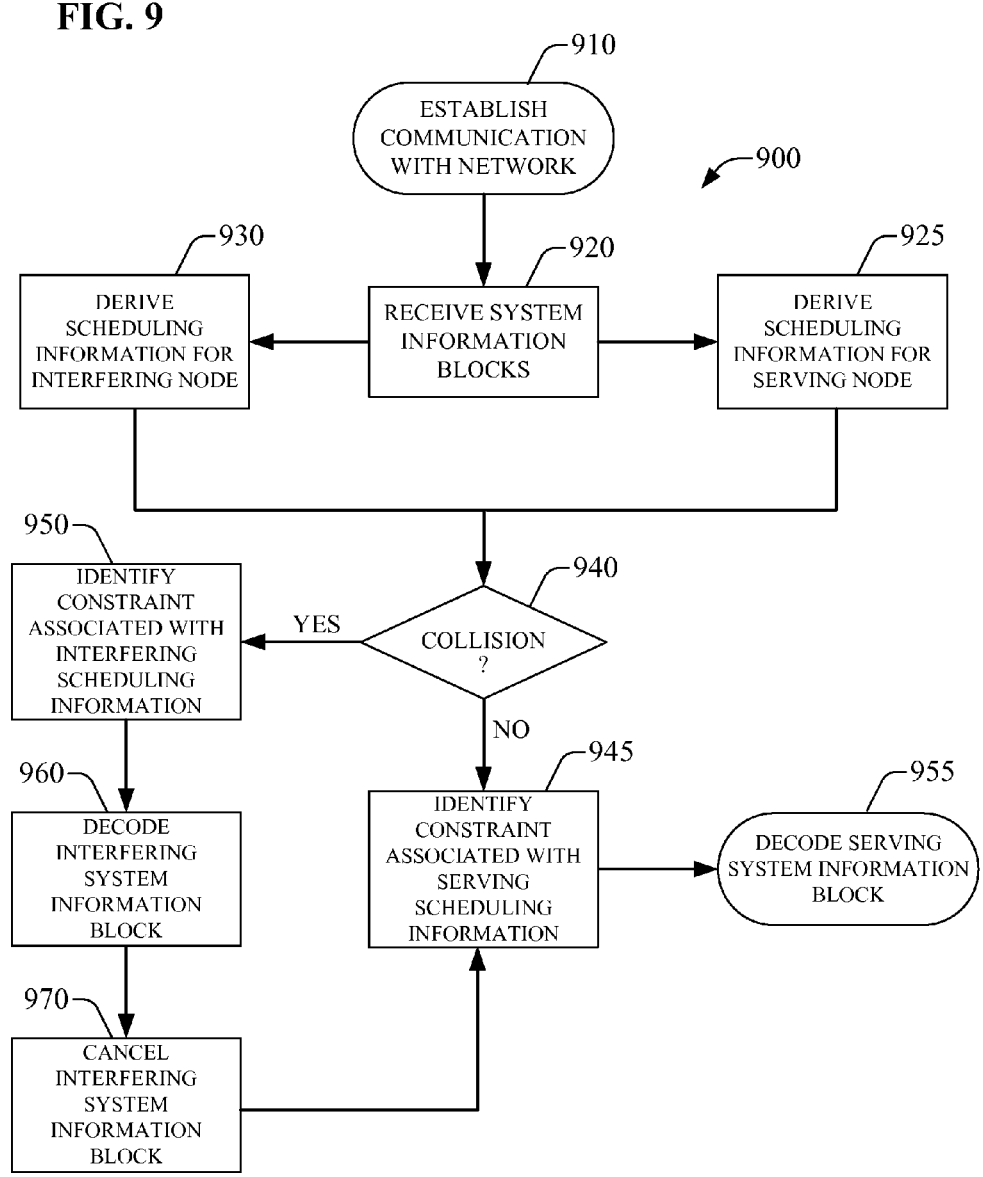
FIG. 9 is a second flow chart illustrating an exemplary methodology that facilitates detecting system information blocks in accordance with an aspect of the subject specification.

Referring next to FIG. 9, a flow chart illustrating an exemplary method that facilitates detecting system information blocks in heterogeneous networks is provided. As illustrated, process 900 includes a series of acts that may be performed by various components of user equipment (e.g., wireless terminal 700) according to an aspect of the subject specification. Process 900 may be implemented by employing at least one processor to execute computer executable instructions stored on a computer readable storage medium to implement the series of acts. In another embodiment, a computer-readable storage medium comprising code which causes at least one computer to implement the acts of process 900 is contemplated.

In an aspect, process 900 begins with a communication being established with a network at act 910. Next, at act 920, system information blocks are received, wherein such system information blocks may be received from serving nodes as well as interfering nodes. Accordingly, in an aspect, scheduling information for both the serving node and the interfering node are derived from known parameters. Namely, scheduling information for the serving node is derived at act 925, whereas scheduling information for the interfering node is derived at act 930.

As stated previously, embodiments are contemplated in which system information blocks within a heterogeneous network are scheduled according to an orthogonal scheduling, a fully colliding scheduling, or a partly colliding scheduling. Therefore, at act 940, process 900 proceeds by determining whether the system information block transmission from the serving node collides with a system information block transmission from the interfering node. If it is determined that the system information block transmissions do not collide, process 900 proceeds to act 945 where a constraint associated with the serving scheduling information is identified, followed by a decoding of the serving system information block at act 955.

However, if it is determined that the system information block transmissions indeed collide, process 900 proceeds to act 950 where a constraint associated with the interfering scheduling information is identified. The interfering system information block is then decoded at act 960, followed by a cancelling of the interfering system information block at act 970. Process 900 then proceeds to act 945 where a constraint associated with the serving scheduling information is identified, followed by a decoding of the serving system information block at act 955.

Exemplary Communication System

Figure 10:
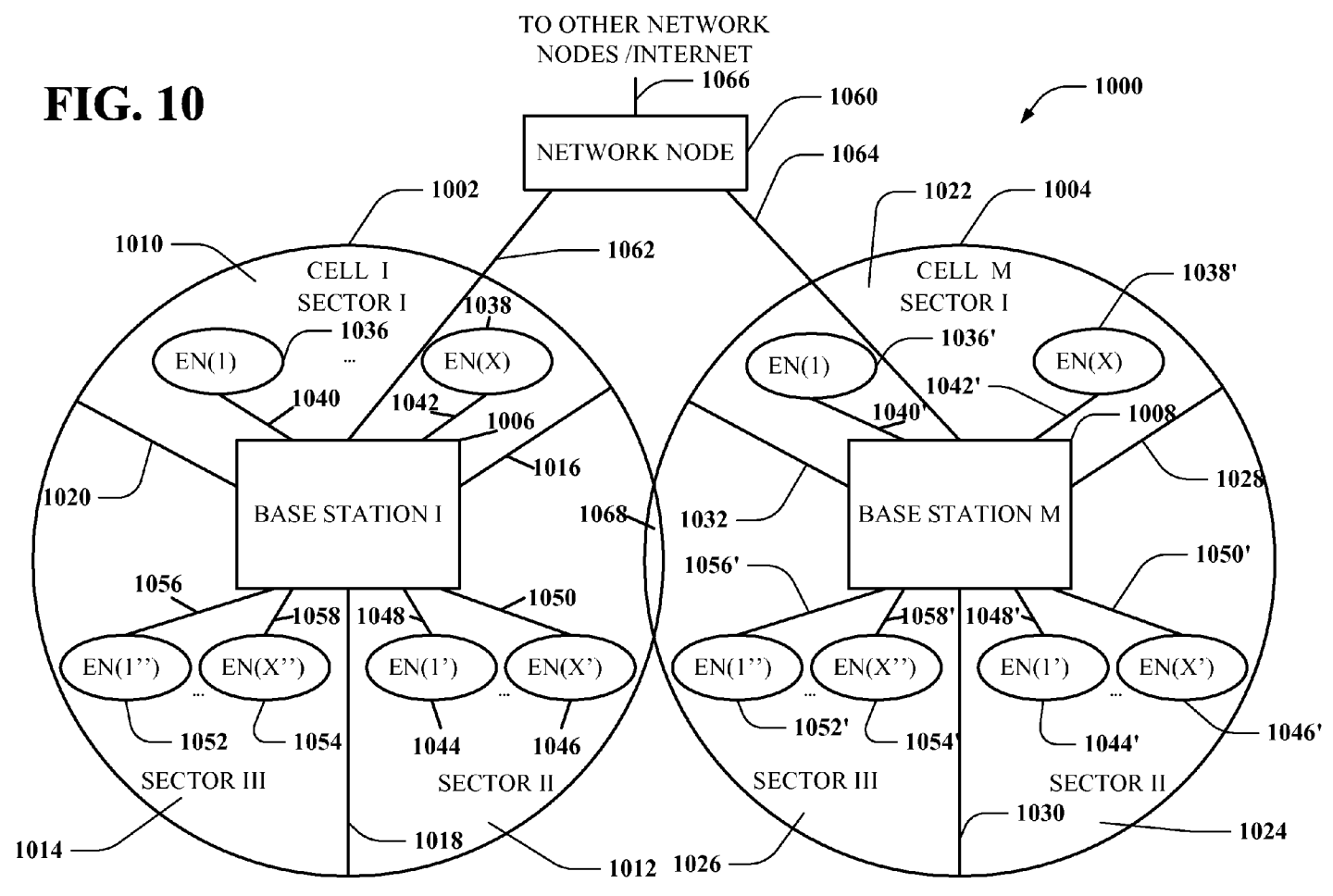

Referring next to FIG. 10, an exemplary communication system 1000 having multiple cells (e.g., cell 1002, cell 1004) is illustrated. Here, it should be noted that neighboring cells 1002, 1004 overlap slightly, as indicated by cell boundary region 1068, thereby creating potential for signal interference between signals transmitted by base stations in neighboring cells. Each cell 1002, 1004 of system 1000 includes three sectors. Cells which have not been subdivided into multiple sectors (N=1), cells with two sectors (N=2) and cells with more than 3 sectors (N>3) can also be utilized. Cell 1002 includes a first sector, sector I 1010, a second sector, sector II 1012, and a third sector, sector III 1014. Each sector 1010, 1012, and 1014 has two sector boundary regions; each boundary region is shared between two adjacent sectors.

Interference between signals transmitted by base stations in neighboring sectors can occur in boundary regions. Line 1016 represents a sector boundary region between sector I 1010 and sector II 1012; line 1018 represents a sector boundary region between sector II 1012 and sector III 1014; line 1020 represents a sector boundary region between sector III 1014 and sector I 1010. Similarly, cell M 1004 includes a first sector, sector I 1022, a second sector, sector II 1024, and a third sector, sector III 1026. Line 1028 represents a sector boundary region between sector I 1022 and sector II 1024; line 1030 represents a sector boundary region between sector II 1024 and sector III 1026; line 1032 represents a boundary region between sector III 1026 and sector I 1022. Cell I 1002 includes a base station (BS), base station I 1006, and a plurality of end nodes (ENs) in each sector 1010, 1012, 1014. Sector I 1010 includes EN(1) 1036 and EN(X) 1038 coupled to BS 1006 via wireless links 1040, 1042, respectively; sector II 1012 includes EN(1') 1044 and EN(X') 1046 coupled to BS 1006 via wireless links 1048, 1050, respectively; sector III 1014 includes EN(1") 1052 and EN(X") 1054 coupled to BS 1006 via wireless links 1056, 1058, respectively. Similarly, cell M 1004 includes base station M 1008, and a plurality of end nodes (ENs) in each sector 1022, 1024, and 1026. Sector I 1022 includes EN(1) 1036' and EN(X) 1038' coupled to BS M 1008 via wireless links 1040', 1042', respectively; sector II 1024 includes EN(1') 1044' and EN(X') 1046' coupled to BS M 1008 via wireless links 1048', 1050', respectively; sector III 1026 includes EN(1") 1052' and EN(X") 1054' coupled to BS 1008 via wireless links 1056', 1058', respectively.

System 1000 also includes a network node 1060 which is coupled to BS I 1006 and BS M 1008 via network links 1062, 1064, respectively. Network node 1060 is also coupled to other network nodes, e.g., other base stations, AAA server nodes, intermediate nodes, routers, etc. and the Internet via network link 1066. Network links 1062, 1064, 1066 may be, e.g., fiber optic cables. Each end node, e.g. EN 1 1036 may be a wireless terminal including a transmitter as well as a receiver. The wireless terminals, e.g., EN(1) 1036 may move through system 1000 and may communicate via wireless links with the base station in the cell in which the EN is currently located. The wireless terminals, (WTs), e.g. EN(1) 1036, may communicate with peer nodes, e.g., other WTs in system 1000 or outside system 1000 via a base station, e.g. BS 1006, and/or network node 1060. WTs, e.g., EN(1) 1036 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones. Although the subject system was described primarily within the context of cellular mode, it is to be appreciated that a plurality of modes may be available and employable in accordance with aspects described herein.

Exemplary Base Station

Figure 11:
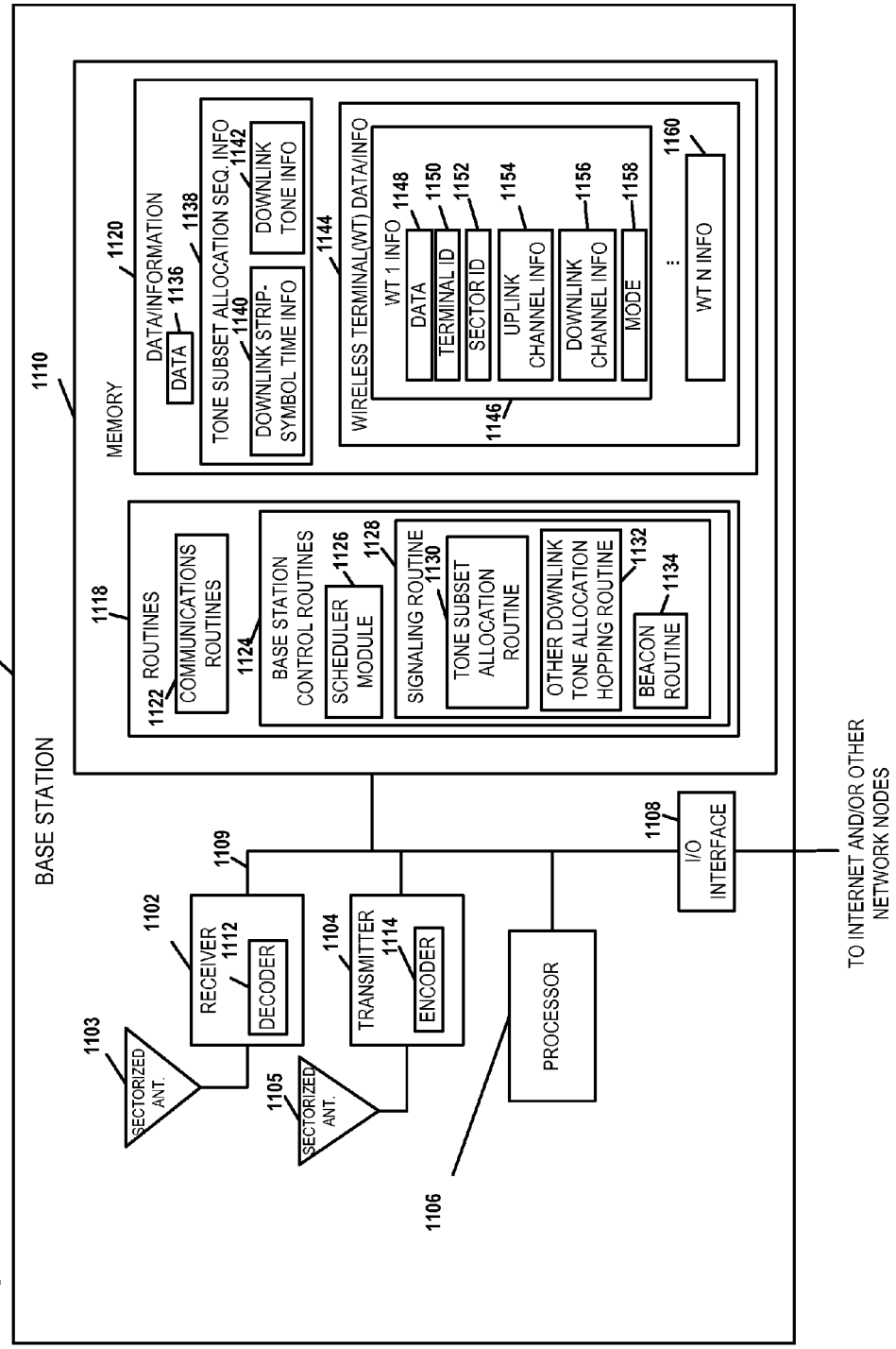
FIG. 11 is an illustration of an exemplary base station in accordance with various aspects described herein.

FIG. 11 illustrates an example base station 1100. Base station 1100 implements tone subset allocation sequences, with different tone subset allocation sequences generated for respective different sector types of the cell. Base station 1100 may be used as any one of base stations 1006, 1008 of the system 1000 of FIG. 10. The base station 1100 includes a receiver 1102, a transmitter 1104, a processor 1106, e.g., CPU, an input/output interface 1108 and memory 1110 coupled together by a bus 1109 over which various elements 1102, 1104, 1106, 1108, and 1110 may interchange data and information.

Sectorized antenna 1103 coupled to receiver 1102 is used for receiving data and other signals, e.g., channel reports, from wireless terminals transmissions from each sector within the base station's cell. Sectorized antenna 1105 coupled to transmitter 1104 is used for transmitting data and other signals, e.g., control signals, pilot signal, beacon signals, etc. to wireless terminals 1200 (see FIG. 12) within each sector of the base station's cell. In various aspects, base station 1100 may employ multiple receivers 1102 and multiple transmitters 1104, e.g., an individual receivers 1102 for each sector and an individual transmitter 1104 for each sector. Processor 1106, may be, e.g., a general purpose central processing unit (CPU). Processor 1106 controls operation of base station 1100 under direction of one or more routines 1118 stored in memory 1110 and implements the methods. I/O interface 1108 provides a connection to other network nodes, coupling the BS 1100 to other base stations, access routers, AAA server nodes, etc., other networks, and the Internet. Memory 1110 includes routines 1118 and data/information 1120.

Data/information 1120 includes data 1136, tone subset allocation sequence information 1138 including downlink strip-symbol time information 1140 and downlink tone information 1142, and wireless terminal (WT) data/info 1144 including a plurality of sets of WT information: WT 1 info 1146 and WT N info 1160. Each set of WT info, e.g., WT 1 info 1146 includes data 1148, terminal ID 1150, sector ID 1152, uplink channel information 1154, downlink channel information 1156, and mode information 1158.

Routines 1118 include communications routines 1122 and base station control routines 1124. Base station control routines 1124 includes a scheduler module 1126 and signaling routines 1128 including a tone subset allocation routine 1130 for strip-symbol periods, other downlink tone allocation hopping routine 1132 for the rest of symbol periods, e.g., non strip-symbol periods, and a beacon routine 1134.

Data 1136 includes data to be transmitted that will be sent to encoder 1114 of transmitter 1104 for encoding prior to transmission to WTs, and received data from WTs that has been processed through decoder 1112 of receiver 1102 following reception. Downlink strip-symbol time information 1140 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1142 includes information including a carrier frequency assigned to the base station 1100, the number and frequency of tones, and the set of tone subsets to be allocated to the strip-symbol periods, and other cell and sector specific values such as slope, slope index and sector type.

Data 1148 may include data that WT1 1200 has received from a peer node, data that WT 1 1200 desires to be transmitted to a peer node, and downlink channel quality report feedback information. Terminal ID 1150 is a base station 1100 assigned ID that identifies WT 1 1200. Sector ID 1152 includes information identifying the sector in which WT1 1200 is operating. Sector ID 1152 can be used, for example, to determine the sector type. Uplink channel information 1154 includes information identifying channel segments that have been allocated by scheduler 1126 for WT1 1200 to use, e.g., uplink traffic channel segments for data, dedicated uplink control channels for requests, power control, timing control, etc. Each uplink channel assigned to WT1 1200 includes one or more logical tones, each logical tone following an uplink hopping sequence. Downlink channel information 1156 includes information identifying channel segments that have been allocated by scheduler 1126 to carry data and/or information to WT1 1200, e.g., downlink traffic channel segments for user data. Each downlink channel assigned to WT1 1200 includes one or more logical tones, each following a downlink hopping sequence. Mode information 1158 includes information identifying the state of operation of WT1 1200, e.g. sleep, hold, on.

Communications routines 1122 are utilized by base station 1100 to perform various communications operations and implement various communications protocols. Base station control routines 1124 are used to control the base station 1100 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1128 controls the operation of receiver 1102 with its decoder 1112 and transmitter 1104 with its encoder 1114. The signaling routine 1128 is responsible controlling the generation of transmitted data 1136 and control information. Tone subset allocation routine 1130 constructs the tone subset to be used in a strip-symbol period using the method of the aspect and using data/info 1120 including downlink strip-symbol time info 1140 and sector ID 1152. The downlink tone subset allocation sequences will be different for each sector type in a cell and different for adjacent cells. The WTs 1200 receive the signals in the strip-symbol periods in accordance with the downlink tone subset allocation sequences; the base station 1100 uses the same downlink tone subset allocation sequences in order to generate the transmitted signals. Other downlink tone allocation hopping routine 1132 constructs downlink tone hopping sequences, using information including downlink tone information 1142, and downlink channel information 1156, for the symbol periods other than the strip-symbol periods. The downlink data tone hopping sequences are synchronized across the sectors of a cell. Beacon routine 1134 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Exemplary Wireless Terminal

Figure 12:
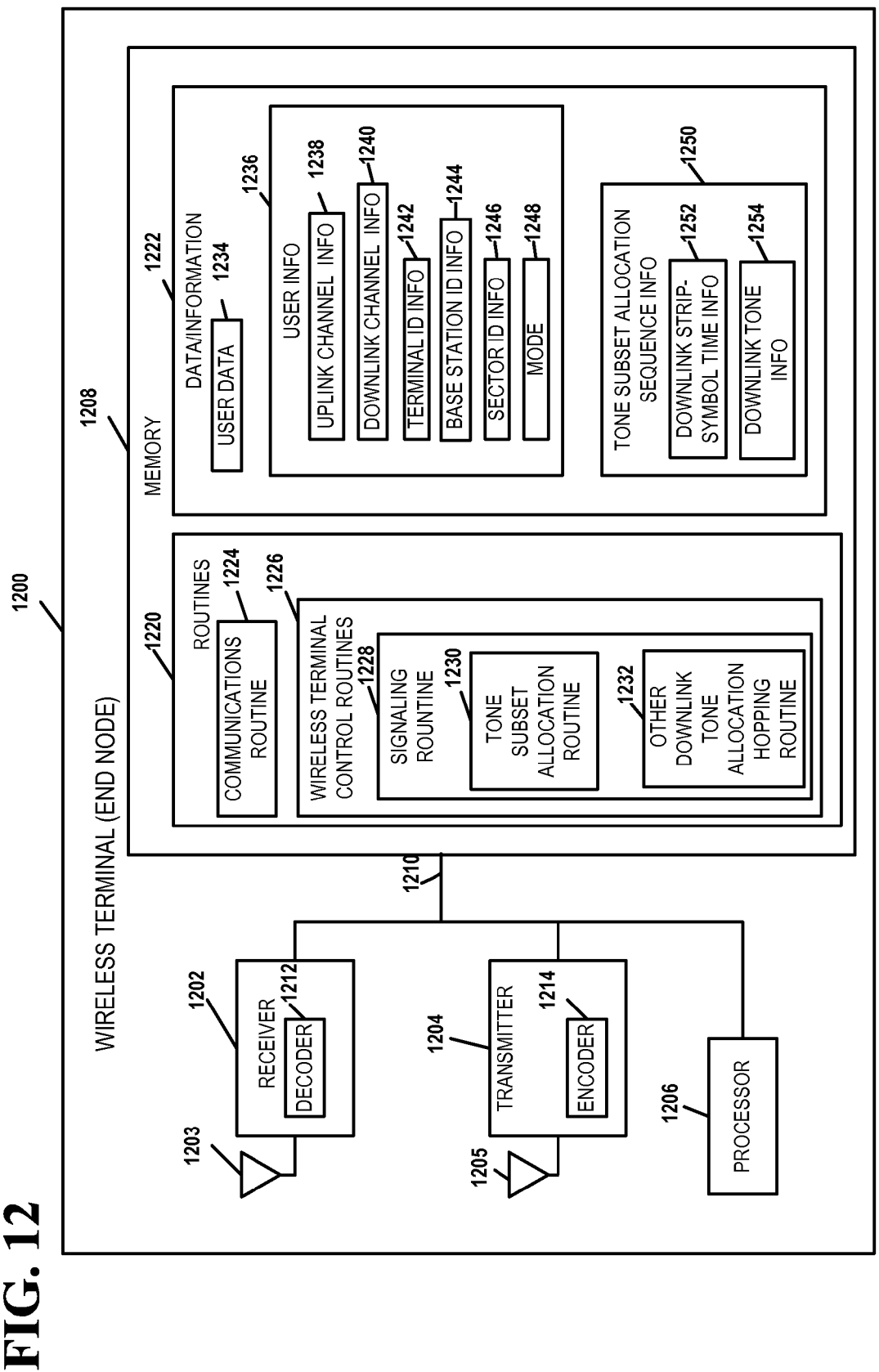
FIG. 12 is an illustration of an exemplary wireless terminal implemented in accordance with various aspects described herein.

FIG. 12 illustrates an example wireless terminal (end node) 1200 which can be used as any one of the wireless terminals (end nodes), e.g., EN(1) 1036, of the system 1000 shown in FIG. 10. Wireless terminal 1200 implements the tone subset allocation sequences. The wireless terminal 1200 includes a receiver 1202 including a decoder 1212, a transmitter 1204 including an encoder 1214, a processor 1206, and memory 1208 which are coupled together by a bus 1210 over which the various elements 1202, 1204, 1206, 1208 can interchange data and information. An antenna 1203 used for receiving signals from a base station (and/or a disparate wireless terminal) is coupled to receiver 1202. An antenna 1205 used for transmitting signals, e.g., to a base station (and/or a disparate wireless terminal) is coupled to transmitter 1204.

The processor 1206, e.g., a CPU controls the operation of the wireless terminal 1200 and implements methods by executing routines 1220 and using data/information 1222 in memory 1208.

Data/information 1222 includes user data 1234, user information 1236, and tone subset allocation sequence information 1250. User data 1234 may include data, intended for a peer node, which will be routed to encoder 1214 for encoding prior to transmission by transmitter 1204 to a base station, and data received from the base station which has been processed by the decoder 1212 in receiver 1202. User information 1236 includes uplink channel information 1238, downlink channel information 1240, terminal ID information 1242, base station ID information 1244, sector ID information 1246, and mode information 1248. Uplink channel information 1238 includes information identifying uplink channels segments that have been assigned by a base station for wireless terminal 1200 to use when transmitting to the base station. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1240 includes information identifying downlink channel segments that have been assigned by a base station to WT 1200 for use when the base station is transmitting data/information to WT 1200. Downlink channels may include downlink traffic channels and assignment channels, each downlink channel including one or more logical tone, each logical tone following a downlink hopping sequence, which is synchronized between each sector of the cell.

User info 1236 also includes terminal ID information 1242, which is a base station-assigned identification, base station ID information 1244 which identifies the specific base station that WT has established communications with, and sector ID info 1246 which identifies the specific sector of the cell where WT 1200 is presently located. Base station ID 1244 provides a cell slope value and sector ID info 1246 provides a sector index type; the cell slope value and sector index type may be used to derive tone hopping sequences. Mode information 1248 also included in user info 1236 identifies whether the WT 1200 is in sleep mode, hold mode, or on mode.

Tone subset allocation sequence information 1250 includes downlink strip-symbol time information 1252 and downlink tone information 1254. Downlink strip-symbol time information 1252 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1254 includes information including a carrier frequency assigned to the base station, the number and frequency of tones, and the set of tone subsets to be allocated to the strip-symbol periods, and other cell and sector specific values such as slope, slope index and sector type.

Routines 1220 include communications routines 1224 and wireless terminal control routines 1226. Communications routines 1224 control the various communications protocols used by WT 1200. Wireless terminal control routines 1226 controls basic wireless terminal 1200 functionality including the control of the receiver 1202 and transmitter 1204. Wireless terminal control routines 1226 include the signaling routine 1228. The signaling routine 1228 includes a tone subset allocation routine 1230 for the strip-symbol periods and an other downlink tone allocation hopping routine 1232 for the rest of symbol periods, e.g., non strip-symbol periods. Tone subset allocation routine 1230 uses user data/info 1222 including downlink channel information 1240, base station ID info 1244, e.g., slope index and sector type, and downlink tone information 1254 in order to generate the downlink tone subset allocation sequences in accordance with some aspects and process received data transmitted from the base station. Other downlink tone allocation hopping routine 1232 constructs downlink tone hopping sequences, using information including downlink tone information 1254, and downlink channel information 1240, for the symbol periods other than the strip-symbol periods. Tone subset allocation routine 1230, when executed by processor 1206, is used to determine when and on which tones the wireless terminal 1200 is to receive one or more strip-symbol signals from the base station 1100. The uplink tone allocation hopping routine 1232 uses a tone subset allocation function, along with information received from the base station, to determine the tones in which it should transmit on.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When the embodiments are implemented in program code or code segments, it should be appreciated that a code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc. Additionally, in some aspects, the steps and/or actions of a method or algorithm can reside as one or any combination or set of codes and/or instructions on a machine readable medium and/or computer readable medium, which can be incorporated into a computer program product.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims Furthermore, to the extent that the term "includes" is used in either the detailed description or the claims, such term is intended to be inclusive in a manner similar to the term "comprising" as "comprising" is interpreted when employed as a transitional word in a claim.

As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, as used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

What is claimed is:

1. A method that facilitates detecting a system information block, the method comprising:
   selecting, via a processor, a type of scheduling information pertaining to the system information block, wherein the type of scheduling information includes at least a resource block allocation;
   associating a known parameter with the type of scheduling information, wherein a decoding of the system information block is facilitated by an association of the known parameter with the type of scheduling information independent of a Physical Downlink Control Channel transmission; and
   transmitting the system information block to a wireless terminal.

2. The method of claim 1, wherein the system information block is a type one system information block (SIB1).

3. The method of claim 1, wherein the known parameter is a system frame number or a cell identifier.

4. The method of claim 1, further comprising determining the known parameter based on a desired scheduling of the system information block relative to a scheduling of an interfering system information block.

5. The method of claim 4, wherein the desired scheduling is an orthogonal scheduling, and wherein the resource block allocation is a non-overlapping resource block allocation relative to an interfering resource block allocation.

6. The method of claim 4, wherein the desired scheduling is a fully colliding scheduling, and wherein the resource block allocation is an identical resource block allocation relative to an interfering resource block allocation.

7. The method of claim 6, further comprising synchronizing a system frame number with an interfering system frame number, wherein the identical resource block allocation is derivable from the system frame number.

8. The method of claim 4, wherein the desired scheduling is a partly colliding scheduling, and wherein the resource block allocation includes overlapping resource blocks and non-overlapping resource blocks relative to an interfering resource block allocation.

9. The method of claim 1, further comprising constraining a second type of scheduling information.

10. The method of claim 9, wherein the constraining comprises limiting a possible number of modulation and coding scheme choices, and wherein a reduction of blind decode operations performed by the wireless terminal is facilitated by the limiting.

11. The method of claim 9, wherein the transmitting comprises communicating an indication of a rule to the wireless terminal, wherein the rule is associated with the constraining of the second type of scheduling information.

12. The method of claim 1, wherein the transmitting comprises communicating the system information block to a plurality of wireless terminals via a plurality of redundancy versions.

13. The method of claim 12, wherein a first subset of the plurality of redundancy versions is associated with legacy wireless terminals, and wherein a second subset of the plurality of redundancy versions is associated with non-legacy wireless terminals.

14. The method of claim 13, wherein the transmitting comprises providing the second subset of the plurality of redundancy versions according to scheduling information derived from the known parameter, wherein the known parameter is known by at least one of the non-legacy wireless terminals.

15. The method of claim 1, wherein the transmitting comprises communicating an indication of a rule to the wireless terminal, wherein the rule is associated with the associating of the known parameter with the type of scheduling information.

16. An apparatus configured to facilitate detecting a system information block, the apparatus comprising:
   a processor configured to execute computer executable components stored in memory, the components including:
     a scheduling component configured to select a type of scheduling information pertaining to the system information block, wherein the type of scheduling information includes at least a resource block allocation;
     an association component configured to associate a known parameter with the type of scheduling information, wherein a decoding of the system information block is facilitated by an association of the known parameter with the type of scheduling information independent of a Physical Downlink Control Channel transmission; and
     a communication component configured to transmit the system information block to a wireless terminal.

17. The apparatus of claim 16, wherein the system information block is a type one system information block (SIB1).

18. The apparatus of claim 16, wherein the known parameter is a system frame number or a cell identifier.

19. The apparatus of claim 16, wherein the association component is configured to determine the known parameter based on a desired scheduling of the system information block relative to a scheduling of an interfering system information block.

20. The apparatus of claim 19, wherein the desired scheduling is an orthogonal scheduling, and wherein the resource block allocation is a non-overlapping resource block allocation relative to an interfering resource block allocation.

21. The apparatus of claim 19, wherein the desired scheduling is a fully colliding scheduling, and wherein the resource block allocation is an identical resource block allocation relative to an interfering resource block allocation.

22. The apparatus of claim 21, wherein the communication component is configured to synchronize a system frame number with an interfering system frame number, and wherein the identical resource block allocation is derivable from the system frame number.

23. The apparatus of claim 19, wherein the desired scheduling is a partly colliding scheduling, and wherein the resource block allocation includes overlapping resource blocks and non-overlapping resource blocks relative to an interfering resource block allocation.

24. The apparatus of claim 16, wherein the scheduling component is configured to constrain a second type of scheduling information.

25. The apparatus of claim 24, wherein the scheduling component is configured to limit a possible number of modulation and coding scheme choices, and wherein a reduction of blind decode operations performed by the wireless terminal is facilitated by the limit.

26. The apparatus of claim 24, wherein the communication component is configured to communicate an indication of a rule to the wireless terminal, wherein the rule is associated with a constraint of the second type of scheduling information.

27. The apparatus of claim 16, wherein the communication component is configured to communicate the system information block to a plurality of wireless terminals via a plurality of redundancy versions.

28. The apparatus of claim 27, wherein a first subset of the plurality of redundancy versions is associated with legacy wireless terminals, and wherein a second subset of the plurality of redundancy versions is associated with non-legacy wireless terminals.

29. The apparatus of claim 28, wherein the communication component is configured to provide the second subset of the plurality of redundancy versions according to scheduling information derived from the known parameter, and wherein the known parameter is known by at least one of the non-legacy wireless terminals.

30. The apparatus of claim 16, wherein the communication component is configured to communicate an indication of a rule to the wireless terminal, wherein the rule is associated with the association of the known parameter with the type of scheduling information.

31. A computer program product that facilitates detecting a system information block, comprising:
a non-transitory computer-readable storage medium comprising code for causing at least one computer to:
select a type of scheduling information pertaining to the system information block, wherein the type of scheduling information includes at least a resource block allocation;
associate a known parameter with the type of scheduling information, wherein a decoding of the system information block is facilitated by an association of the known parameter with the type of scheduling information independent of a Physical Downlink Control Channel transmission; and
transmit the system information block to a wireless terminal.

32. The computer program product of claim 31, wherein the system information block is a type one system information block (SIB1).

33. The computer program product of claim 31, wherein the known parameter is a system frame number or a cell identifier.

34. The computer program product of claim 31, wherein the type of scheduling information is a resource block allocation.

35. The computer program product of claim 31, wherein the code causes the at least one computer to determine the known parameter based on a desired scheduling of the system information block relative to a scheduling of an interfering system information block.

36. The computer program product of claim 35, wherein the desired scheduling is an orthogonal scheduling, and wherein the resource block allocation is a non-overlapping resource block allocation relative to an interfering resource block allocation.

37. The computer program product of claim 35, wherein the desired scheduling is a fully colliding scheduling, and wherein the resource block allocation is an identical resource block allocation relative to an interfering resource block allocation.

38. The computer program product of claim 37, wherein the code causes the at least one computer to synchronize a system frame number with an interfering system frame number, and wherein the identical resource block allocation is derivable from the system frame number.

39. The computer program product of claim 35, wherein the desired scheduling is a partly colliding scheduling, and wherein the resource block allocation includes overlapping resource blocks and non-overlapping resource blocks relative to an interfering resource block allocation.

40. The computer program product of claim 31, wherein the code causes the at least one computer to constrain a second type of scheduling information.

41. The computer program product of claim 40, wherein the code causes the at least one computer to limit a possible number of modulation and coding scheme choices, and wherein a reduction of blind decode operations performed by the wireless terminal is facilitated by the limit.

42. The computer program product of claim 40, wherein the code causes the at least one computer to communicate an indication of a rule to the wireless terminal, wherein the rule is associated with a constraint of the second type of scheduling information.

43. An apparatus configured to facilitate detecting a system information block, the apparatus comprising:
means for selecting a type of scheduling information pertaining to the system information block, wherein the type of scheduling information includes at least a resource block allocation;
means for associating a known parameter with the type of scheduling information, wherein a decoding of the system information block is facilitated by an association of the known parameter with the type of scheduling information independent of a Physical Downlink Control Channel transmission; and
means for transmitting the system information block to a wireless terminal.

44. The apparatus of claim 43, wherein the known parameter is a system frame number or a cell identifier.

45. The apparatus of claim 43, wherein the means for associating is configured to determine the known parameter based on a desired scheduling of the system information block relative to a scheduling of an interfering system information block.

46. The apparatus of claim 45, wherein the desired scheduling is an orthogonal scheduling, and wherein the resource block allocation is a non-overlapping resource block allocation relative to an interfering resource block allocation.

47. The apparatus of claim 45, wherein the desired scheduling is a fully colliding scheduling, and wherein the resource block allocation is an identical resource block allocation relative to an interfering resource block allocation.

48. The apparatus of claim 47, wherein the means for transmitting is configured to synchronize a system frame number with an interfering system frame number, and wherein the identical resource block allocation is derivable from the system frame number.

49. The apparatus of claim 45, wherein the desired scheduling is a partly colliding scheduling, and wherein the resource block allocation includes overlapping resource blocks and non-overlapping resource blocks relative to an interfering resource block allocation.

50. The apparatus of claim 43, wherein the means for transmitting is configured to communicate the system information block to a plurality of wireless terminals via a plurality of redundancy versions.

51. The apparatus of claim 50, wherein a first subset of the plurality of redundancy versions is associated with legacy wireless terminals, and wherein a second subset of the plurality of redundancy versions is associated with non-legacy wireless terminals.

52. The apparatus of claim 51, wherein the means for transmitting is configured to provide the second subset of the plurality of redundancy versions according to scheduling information derived from the known parameter, and wherein the known parameter is known by at least one of the non-legacy wireless terminals.

53. The apparatus of claim 43, wherein the means for transmitting is configured to communicate an indication of a rule to the wireless terminal, wherein the rule is associated with the association of the known parameter with the type of scheduling information.

54. A method that facilitates detecting a system information block, the method comprising:
receiving a transmission of the system information block;
deriving, via a processor, a type of scheduling information associated with the transmission from at least one known parameter, wherein the type of scheduling information includes at least a resource block allocation; and
decoding the system information block based on the type of scheduling information, wherein the decoding is performed independent of a Physical Downlink Control Channel transmission.

55. The method of claim 54, wherein the system information block is a type one system information block (SIB1).

56. The method of claim 54, wherein the at least one known parameter is a system frame number or a cell identifier.

57. The method of claim 54, further comprising identifying a constraint associated with a second type of scheduling information.

58. The method of claim 57, wherein the constraint is associated with a limiting of a possible number of modulation and coding scheme choices, and wherein a reduction of blind decode operations is facilitated by the constraint.

59. The method of claim 54, wherein the transmission is received via a plurality of redundancy versions, and wherein the receiving comprises distinguishing a first subset of the plurality of redundancy versions associated with legacy wireless terminals from a second subset of the plurality of redundancy versions associated with non-legacy wireless terminals.

60. The method of claim 54, further comprising detecting a collision between a first system information block and a second system information block.

61. The method of claim 60, further comprising cancelling reconstructed symbols corresponding to contents decoded from the first system information block, wherein the cancelling is based on a detection of the collision.

62. The method of claim 60, wherein the detecting is based on an association between the type of scheduling information and the at least one known parameter.

63. An apparatus configured to facilitate detecting a system information block, the apparatus comprising:
a processor configured to execute computer executable components stored in memory, the components including:
a communication component configured to receive a transmission of the system information block;
a derivation component configured to derive a type of scheduling information associated with the transmission from at least one known parameter, wherein the type of scheduling information includes at least a resource block allocation; and
a decoding component configured to perform a decoding of the system information block based on the type of scheduling information, wherein the decoding is performed independent of a Physical Downlink Control Channel transmission.

64. The apparatus of claim 63, wherein the system information block is a type one system information block (SIB1).

65. The apparatus of claim 63, wherein the at least one known parameter is a system frame number or a cell identifier.

66. The apparatus of claim 63, further comprising a constraint component configured to identify a constraint associated with a second type of scheduling information.

67. The apparatus of claim 66, wherein the constraint is associated with a limiting of a possible number of modulation and coding scheme choices, and wherein a reduction of blind decode operations is facilitated by the constraint.

68. The apparatus of claim 63, wherein the transmission is received via a plurality of redundancy versions, and wherein the communication component is configured to distinguish a first subset of the plurality of redundancy versions associated with legacy wireless terminals from a second subset of the plurality of redundancy versions associated with non-legacy wireless terminals.

69. The apparatus of claim 63, further comprising a detection component configured to detect a collision between a first system information block and a second system information block.

70. The apparatus of claim 69, further comprising a cancellation component configured to cancel reconstructed symbols corresponding to contents decoded from the first system information block based on a detection of the collision.

71. The apparatus of claim 69, wherein the detection is based on an association between the type of scheduling information and the at least one known parameter.

72. A computer program product that facilitates detecting a system information block, comprising:
a non-transitory computer-readable storage medium comprising code for causing at least one computer to:
receive a transmission of the system information block;
derive a type of scheduling information associated with the transmission from at least one known parameter, wherein the type of scheduling information includes at least a resource block allocation; and
decode the system information block based on the type of scheduling information, wherein the system information block is decoded independent of a Physical Downlink Control Channel transmission.

73. The computer program product of claim 72, wherein the code causes the at least one computer to identify a constraint associated with a second type of scheduling information.

74. The computer program product of claim 73, wherein the constraint is associated with a limiting of a possible number of modulation and coding scheme choices, and wherein a reduction of blind decode operations is facilitated by the constraint.

75. The computer program product of claim 72, wherein the transmission is received via a plurality of redundancy versions, and wherein the code causes the at least one computer to distinguish a first subset of the plurality of redundancy versions associated with legacy wireless terminals from a second subset of the plurality of redundancy versions associated with non-legacy wireless terminals.

76. The computer program product of claim 72, wherein the code causes the at least one computer to detect a collision between a first system information block and a second system information block.

77. The computer program product of claim 76, wherein the code causes the at least one computer to cancel reconstructed symbols corresponding to contents decoded from the first system information block based on a detection of the collision.

78. The computer program product of claim 76, wherein the detection is based on an association between the type of scheduling information and the at least one known parameter.

79. An apparatus configured to facilitate detecting a system information block, the apparatus comprising:
- means for receiving a transmission of the system information block;
- means for deriving a type of scheduling information associated with the transmission from at least one known parameter, wherein the type of scheduling information includes at least a resource block allocation; and
- means for decoding the system information block based on the type of scheduling information, wherein the system information block is decoded independent of a Physical Downlink Control Channel transmission.

80. The apparatus of claim 79, wherein the system information block is a type one system information block (SIB1).

81. The apparatus of claim 79, wherein the at least one known parameter is a system frame number or a cell identifier.

\* \* \* \* \*